(12) United States Patent
Morrill

(10) Patent No.: US 10,934,180 B1
(45) Date of Patent: Mar. 2, 2021

(54) HYDRODYNAMIC CAVITATION DEVICE

(71) Applicant: KD Enterprises LLC, Honolulu, HI (US)

(72) Inventor: Keith A. Morrill, Honolulu, HI (US)

(73) Assignee: KD Enterprises LLC, Honolulu, HI (US)

( * ) Notice: Subject to any disclaimer, the term of this patent is extended or adjusted under 35 U.S.C. 154(b) by 55 days.

(21) Appl. No.: 16/836,346

(22) Filed: Mar. 31, 2020

(51) Int. Cl.
*C02F 1/34* (2006.01)
*C02F 103/42* (2006.01)

(52) U.S. Cl.
CPC ............ *C02F 1/34* (2013.01); *C02F 2103/42* (2013.01); *C02F 2201/004* (2013.01)

(58) Field of Classification Search
CPC .......... C02F 1/32; C02F 1/34; C02F 2303/22; C02F 2307/14; C02F 1/36; C02F 2301/028; C02F 2301/026; A22C 25/02; A22C 17/08
See application file for complete search history.

(56) References Cited

U.S. PATENT DOCUMENTS

2008/0029462 A1\* 2/2008 Huymann ................ C02F 1/34
210/748.01
2019/0105673 A1  4/2019 Wambsgans

FOREIGN PATENT DOCUMENTS

WO  2019/030741 A1  2/2019

OTHER PUBLICATIONS

Chakinala, Anand G., et al., "Treatment of industrial wastewater effluents using hydrodynamic cavitation and the advanced Fenton process", Ultrasonics sonochemistry 15.1 (2008): 49-54.
Chakinala, Anand G., et al., "Industrial wastewater treatment using hydrodynamic cavitation and heterogeneous advanced Fenton processing", Chemical Engineering Journal 152.2-3 (2009): 498-502.
Tao, Yuequn, et al., "Application of hydrodynamic cavitation to wastewater treatment", Chemical engineering & technology 39.8 (2016): 1363-1376.
Dular, Matevž, et al., "Use of hydrodynamic cavitation in (waste) water treatment", Ultrasonics sonochemistry 29 (2016): 577-588.

\* cited by examiner

*Primary Examiner* — Walter D. Griffin
*Assistant Examiner* — Cameron J Allen
(74) *Attorney, Agent, or Firm* — Mintz Levin Cohn Ferris Glovsky and Popeo, P.C.

(57) ABSTRACT

A hydrodynamic cavitation unit for a hydrodynamic cavitation device is provided. The hydrodynamic cavitation device is configured for fluid communication with an inlet conduit and an outlet conduit. The hydrodynamic cavitation unit includes a body; and a plurality of lumens through the body. Each of the lumens is configured for fluid communication from the inlet conduit, through the body, and to the outlet conduit. A ratio of a total cross-sectional area of the lumens to a cross-sectional area of the inlet conduit is about 1:1. A ratio of a cross-sectional area of the hydrodynamic cavitation unit to the cross-sectional area of the inlet conduit is about 2:1. Each of the lumens may have a frustoconical or Venturi shape. Related apparatuses, systems, techniques, and articles are also described.

14 Claims, 16 Drawing Sheets

HYDRODYNAMIC CAVITATION DEVICE

FIELD OF THE DISCLOSURE

The present disclosure relates to a hydrodynamic cavitation device. The hydrodynamic cavitation device may be used for water treatment of bodies of water including swimming pools, spas, ponds, water features (e.g., fountains), water parks, and potable water in municipal, commercial and residential applications.

BACKGROUND

Hydrodynamic cavitation devices have been developed for water treatment. A device including a generic orifice, either alone or in combination with a generic blade, was proposed (Chakinala, Anand G., et al., "Treatment of industrial wastewater effluents using hydrodynamic cavitation and the advanced Fenton process", Ultrasonics sonochemistry 15.1 (2008): 49-54; and Chakinala, Anand G., et al., "Industrial wastewater treatment using hydrodynamic cavitation and heterogeneous advanced Fenton processing", Chemical Engineering Journal 152.2-3 (2009): 498-502). Additionally, a device including a generic Venturi with various orifice patterns was proposed (Tao, Yuequn, et al., "Application of hydrodynamic cavitation to wastewater treatment", Chemical engineering & technology 39.8 (2016): 1363-1376). Further, a device requiring multiple rotating parts was proposed (Dular, Matevž, et al., "Use of hydrodynamic cavitation in (waste) water treatment", Ultrasonics sonochemistry 29 (2016): 577-588). Still further, multiple devices requiring a catalyst were proposed. The developed devices lack enabling specificity, require maintenance and are costly to manufacture and operate. Thus, a need has arisen for an improved hydrodynamic cavitation device and system to overcome at least the above-referenced problems.

SUMMARY

One or more of the following features may be included in any feasible combination.

The present disclosure provides a hydrodynamic cavitation unit for a hydrodynamic cavitation device provided in fluid communication with an inlet conduit and an outlet conduit. The hydrodynamic cavitation unit may include a body. The hydrodynamic cavitation unit may include at least one lumen through the body. The at least one lumen may be configured for fluid communication from the inlet conduit, through the body, and to the outlet conduit. A ratio of a total cross-sectional area of the at least one lumen to a cross-sectional area of the inlet conduit may be about 1:1. A ratio of a cross-sectional area of the hydrodynamic cavitation unit to the cross-sectional area of the inlet conduit is about 2:1.

The at least one lumen may have a frustoconical shape. The at least one lumen having the frustoconical shape may be disposed at a pitch angle greater than about 2° and less than about 5°. The pitch angle may be about 3°.

The at least one lumen may include an inlet opening. The at least one lumen may include an outlet opening. The inlet opening may have an inlet area, the outlet opening may have an outlet area, and a ratio of the outlet area to the inlet area may be about 0.75.

The 1:1 ratio of the total cross-sectional area of the at least one lumen to the cross-sectional area of the inlet conduit may occur at an intermediate point of the at least one lumen between the inlet opening and the outlet opening. The intermediate point may be located a first spaced distance apart from the inlet opening, and a second spaced distance apart from the outlet opening. A ratio of the first spaced distance to the second spaced distance may be about 4:1.

The area within the at least one lumen may linearly decrease from an inlet side of the hydrodynamic cavitation unit to an outlet side of the hydrodynamic cavitation unit The frustoconical shape may have an inlet maximum cross-sectional dimension, an outlet maximum cross-sectional dimension, and a length in a direction perpendicular to the inlet maximum cross-sectional dimension and the outlet maximum cross-sectional dimension. A ratio of the inlet maximum cross-sectional dimension to the outlet cross-sectional dimension to the length is about 212:160:1000, respectively.

The at least one lumen may have a Venturi shape. The Venturi shape may have an inlet opening, an inlet region, an outlet region, a throat region between the inlet region and the outlet region, and an outlet opening. The inlet region may be disposed at a first pitch angle greater than about 8° and less than about 12°. The outlet region may be disposed at a second pitch angle greater than about 2° and less than about 5°. The first pitch angle may be about 10°. The second pitch angle may be about 3°. The 1:1 ratio of the total cross-sectional area of the at least one lumen to the cross-sectional area of the inlet conduit may occur at a first intermediate point of the at least one lumen in the inlet region. The 1:1 ratio of the total cross-sectional area of the at least one lumen to the cross-sectional area of the inlet conduit may occur at a second intermediate point of the at least one lumen in the outlet region. The first intermediate point may be located a first spaced distance apart from the inlet opening, and a second spaced distance apart from the throat region. A first ratio of the first spaced distance to the second spaced distance may be between about 3:1 to about 4:1. The second intermediate point may be located a third spaced distance apart from the outlet opening, and a fourth spaced distance apart from the throat region. A second ratio of the third spaced distance to the fourth spaced distance may be about 1:3. A ratio of a first length of the inlet region to a second length of the throat region to a third length of the outlet region may be about 300:300:350, respectively. A ratio of a first cross-sectional area of the inlet region to a second cross-sectional area of the throat region to a third cross-sectional area of the outlet region is about 212:160:175, respectively.

The hydrodynamic cavitation unit configured with the 1:1 ratio and the 2:1 ratio may generate hydrodynamic cavitation in response to the fluid communication at a rate of greater than about 10 gallons (about 38 L) per minute and less than about 110 gallons (about 416 L) per minute.

The hydrodynamic cavitation unit may exclude a catalyst. The hydrodynamic cavitation device may exclude the catalyst.

Additionally, a hydrodynamic cavitation device may be provided in fluid communication with an inlet conduit and an outlet conduit. The hydrodynamic cavitation device may include a hydrodynamic cavitation unit. The hydrodynamic cavitation unit may include a body. The hydrodynamic cavitation unit may include at least one lumen through the body. The at least one lumen may be configured for fluid communication from the inlet conduit, through the body, and to the outlet conduit. The hydrodynamic cavitation device may exclude a catalyst. A ratio of a total cross-sectional area of the at least one lumen to a cross-sectional area of the inlet conduit may be about 1:1. A ratio of a cross-sectional area of the hydrodynamic cavitation unit to the cross-sectional area of the inlet conduit is about 2:1. The hydrodynamic cavitation unit configured with the 1:1 ratio and the 2:1 ratio may generate hydrodynamic cavitation in response to the fluid communication at a rate of greater than about 10 gallons per minute and less than about 110 gallons per minute.

Further, a hydrodynamic cavitation unit for a hydrodynamic cavitation device is provided. The hydrodynamic cavitation unit may be in fluid communication with an inlet conduit and an outlet conduit. The hydrodynamic cavitation unit may include a body. The hydrodynamic cavitation unit may include at least one lumen through the body. The at least one lumen may be configured for fluid communication from the inlet conduit, through the body, and to the outlet conduit. The at least one lumen may have a frustoconical shape. The at least one lumen having the frustoconical shape may be disposed at a pitch angle greater than about 2° and less than about 5°. The at least one lumen may have a Venturi shape. The Venturi shape may have an inlet opening, an inlet region, an outlet region, a throat region between the inlet region and the outlet region, and an outlet opening. The inlet region may be disposed at a first pitch angle greater than about 8° and less than about 12°. The outlet region may be disposed at a second pitch angle greater than about 2° and less than about 5°.

Notably, the present invention is not limited to the combination of the elements as listed above and may be assembled in any combination of the elements as described herein.

These and other capabilities of the disclosed subject matter will be more fully understood after a review of the following figures, detailed description, and claims.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1:
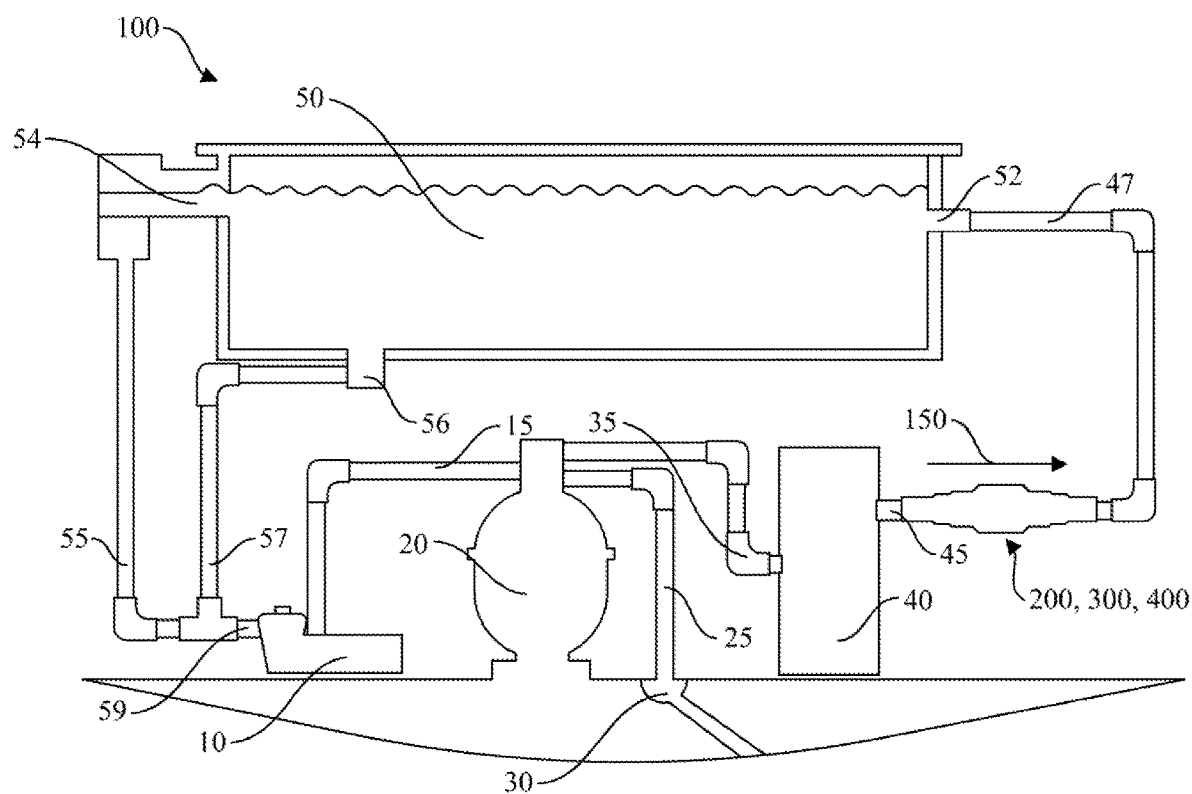
FIG. 1 is a diagram of a hydrodynamic cavitation system according to an exemplary embodiment of the present disclosure.

It is noted that the drawings are not necessarily to scale. The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting exemplary embodiments and that the scope of the present invention is defined solely by the claims.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least one exemplary embodiment is described as using a plurality of units to perform the exemplary process, it is understood that the exemplary processes may also be performed by one or plurality of modules. Additionally, it is understood that the term controller/control unit may refer to a hardware device that includes a memory and a processor. The memory may be configured to store the modules and the processor may be specifically configured to execute said modules to perform one or more processes which are described further below.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third", "type-A", "type-B", "type-I", "type-II", "type-α", "type-β" and so on, herein, are provided to identify structures or operations, without describing an order of structures or operations, and, to the extent the structures or operations are used in an exemplary embodiment, the structures may be provided or the operations may be executed in a different order from the stated order unless a specific order is definitely specified in the context.

An improved hydrodynamic cavitation device and system are provided. The device and system generate hydrodynamic cavitation in water and promote improvements to water quality. Improvements include reduction of pathogens and bacteria, reduction of heavy metal, promotion of negative ion charge in water, promotion of restructured water (i.e., $H_2O$ to $H_3O_2$), reduction of unwanted chemicals, reduction of corrosive effects due to chemical treatment, reduction of calcium phosphate deposits, improvement of plant growth, promotion of oxidation reduction potential of water, reduction in water evaporation, promotion of health (hair, skin, etc.), reduction in rinse time due to reduction in amount of soap and shampoo, reduction in detergent use, improvement in cleaning, improved taste, improved water softness, reduction in odor, reduction in residual spots on glass and other surfaces, reduction in rust rings and deposits in plumbing fixtures, reduction of soap scum, among others. The device and system have a compact footprint, do not require additional electrical power, do not require electrical grounding, do not require expensive materials, and do not require additional moving parts.

The present device and system do not require any catalyst. As used herein, the term "catalyst" includes any catalytic chemical or structure including but not limited to one or more of proton acids; multifunctional solids, e.g., zeolites, alumina, higher-order oxides, graphitic carbon, nanoparticles, nanodots, and facets of bulk materials; transition metals, e.g., nickel, such as Raney nickel for hydrogenation, copper, and vanadium oxide for oxidation of sulfur dioxide into sulfur trioxide; late transition metals, e.g., palladium, platinum, gold, ruthenium, rhodium, and iridium; combinations of the same; and the like. As a result, a cost of manufacturing the present device and system may be reduced relative to those that require a catalyst.

The present system and device create a differential in pressure inside a chamber. In implementations of the system and device to a swimming pool, spa, pond, water feature (e.g., fountain), water park, and the like, water passes through the chamber of the present device. The device promotes hydrodynamic cavitation, which transforms a portion of flowing water from a liquid state to a gas state, i.e., bubbles. The bubbles collapse, return to a liquid state, and exit the device. During cavitation, temperatures in the collapsing bubbles may temporarily exceed about 5000° F. (about 2760° C.). The heat from cavitation breaks down impurities in the water.

FIG. 1 is a diagram of a hydrodynamic cavitation system 100 according to an exemplary embodiment of the present disclosure. The hydrodynamic cavitation system 100 may include a hydrodynamic cavitation device 200, 300, 400 (described in greater detail below). Arrow 150 represents a predominant flow direction of a fluid through the hydrodynamic cavitation device 200, 300, 400 in a standard operating mode. The hydrodynamic cavitation device 200, 300, 400 may be used for fluid flowing in a reverse direction opposite the predominant flow direction 150 in a nonstandard operating mode.

The hydrodynamic cavitation device 200, 300, 400 as illustrated in FIG. 1 may be applied to a swimming pool, spa, pond, water feature (e.g., fountain), water park, and the like, where the body of water 50 is predominantly contained within the swimming pool, spa, pond, water feature (e.g., fountain), water park, or the like. However, the hydrodynamic cavitation device 200, 300, 400 is not limited to the illustrated application. The hydrodynamic cavitation device 200, 300, 400 may be used with any body of water. For example, the hydrodynamic cavitation device 200, 300, 400 may be connected in series between any two types of conduits. In some implementations, the hydrodynamic cavitation device 200, 300, 400 may be installed anywhere within a home. The hydrodynamic cavitation device 200, 300, 400 may be connected within a home to a water main of a water system. The hydrodynamic cavitation device 200, 300, 400 may be installed at a point of dispensation, such as a water faucet, a water cooler or a fresh water component of a soda fountain.

Returning to the exemplary embodiment of FIG. 1, the hydrodynamic cavitation system 100 may include one or more of a pump 10, a filter 20, a drain 30, a heater 40, a container for a body of fluid or a body of water 50. Although the hydrodynamic cavitation device 200, 300, 400 is illustrated downstream of the heater 40 and upstream of the body of water 50, the hydrodynamic cavitation device 200, 300, 400 may be installed at any point within the system 100.

One or more of the pump 10, the filter 20, the drain 30, the heater 40, and the hydrodynamic cavitation device 200, 300, 400 may be connected to the body of water 50 in any suitable manner. The pump 10 may be connected to the filter 20 via a first conduit 15. The filter 20 may be connected to the drain 30 via a second conduit 25. The filter 20 may be connected to the heater via a third conduit 35. The heater 40 may be connected to the hydrodynamic cavitation device 200, 300, 400 via a fourth conduit 45. The hydrodynamic cavitation device 200, 300, 400 may be connected to the body of water 50 via a fifth conduit 47. Water from the body of water 50 may be returned to the pump 10 via one or more of a sixth conduit 55, a seventh conduit 57 and an eighth conduit 59.

As shown in FIG. 1, the swimming pool or spa may include at least one jet 52, which may be connected to the fifth conduit 47. The swimming pool may include a skimmer 54, which may be connected to the pump 10 via the sixth conduit 55 and the eighth conduit 59. The swimming pool may include a drain 56, which may be connected to the pump 10 via the seventh conduit 57 and the eighth conduit 59. The conduits 15, 25, 35, 45, 47, 55, 57 and 59 may be any suitable material including rigid polyvinyl chloride (PVC) pipe in any suitable size including Schedule 40 and/or Schedule 80.

Regardless of any implementation described hereinabove, exemplary details of the hydrodynamic cavitation device 200, 300, 400 are provided hereinbelow.

Figure 2:
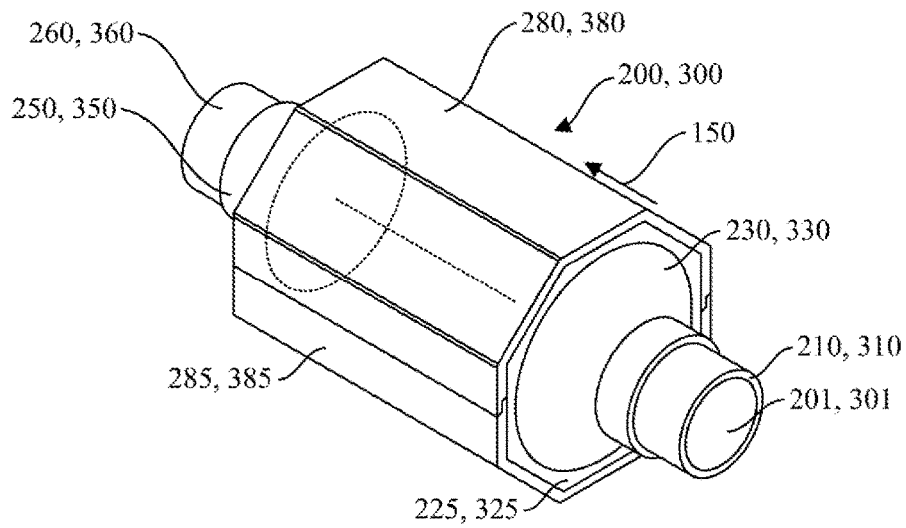
FIG. 2 is a perspective view of a type-I hydrodynamic cavitation device for the hydrodynamic cavitation system of FIG. 1 according to an exemplary embodiment of the present disclosure.

FIG. 2 is a perspective view of a type-I hydrodynamic cavitation device 200, 300, which may be used with the hydrodynamic cavitation system 100 of FIG. 1 according to an exemplary embodiment of the present disclosure. The type-I hydrodynamic cavitation device 200, 300 may include an inlet 201, 301 and an outlet 299, 399 (shown, e.g., in FIG. 3). Please note, throughout the present specification, a comma (",") may be provided between reference numbers (e.g., "201, 301") to denote similar structures for different exemplary embodiments. The listing of reference numbers in this manner may be interpreted to include the term "respectively". For example, the sentence above may be interpreted as follows: "The type-I hydrodynamic cavitation device 200, 300 may include an inlet 201, 301, respectively, and an outlet 299, 399, respectively." The term "respectively" is omitted hereinbelow for the sake of brevity but may be understood or omitted. The use of the comma and an exemplary implication of "respectively" are not intended to be limiting, and one or more features of any one exemplary embodiment may be combined with one or more features of any other exemplary embodiment without limitation.

Between the inlet 201, 301 and the outlet 299, 399, a body of the hydrodynamic cavitation device 200, 300 may include an inlet side type-X vortex unit 210, 310. The body of the hydrodynamic cavitation device 200, 300 may include an outlet side type-X vortex unit 260, 360. The inlet side type-X vortex unit 210, 310 may be directly connected to a conduit, such as the fourth conduit 45, and the outlet side type-X vortex unit 260, 360 may be directly connected to a conduit, such as the fifth conduit 47. One or more of the inlet side type-X vortex unit 210, 310 and the outlet side type-X vortex unit 260, 360 may be configured to promote clockwise rotation of fluid flowing through the hydrodynamic cavitation device 200, 300.

The body of the hydrodynamic cavitation device 200, 300 may include an inlet side expander/reducer 230, 330. The body of the hydrodynamic cavitation device 200, 300 may include an outlet side expander/reducer 250, 350.

The inlet side type-X vortex unit 210, 310, and the outlet side type-X vortex unit 260, 360 may be omitted. For example, in lieu of the inlet side type-X vortex unit 210, 310, the inlet side expander/reducer 230, 330 may be directly connected to a conduit, such as the fourth conduit 45. Additionally, in lieu of the outlet side type-X vortex unit 250, 350, the outlet side expander/reducer 250, 350 may be directly connected to a conduit, such as the fifth conduit 47.

The body of the hydrodynamic cavitation device 200, 300 may include an inlet side spacer 225, 325 and an outlet side spacer 275, 375. The body of the hydrodynamic cavitation device 200, 300 may include a protective cover. The protective cover may include a first portion 280, 380 and a second portion 285, 385. The inlet side spacer 225, 325 and the outlet side spacer 275, 375 may bridge a gap between the inlet side expander/reducer 230, 330 and the outlet side expander/reducer 250, 350 and the protective cover including the first portion 280, 380 and the second portion 285, 385. For example, as shown in FIG. 2, a radially outward surface of the inlet side expander/reducer 230, 330 and the outlet side expander/reducer 250, 350 may be circular, a radially inward surface of the inlet side spacer 225, 325 and the outlet side spacer 275, 375 may be circular, a radially outward surface of the inlet side spacer 225, 325 and the outlet side spacer 275, 375 may be polygonal (e.g., octagonal, as shown), and a radially inward surface of the first portion 280, 380 and the second portion 285, 385 of the protective cover may be polygonal (e.g., octagonal, as shown).

Figures 3, 4:
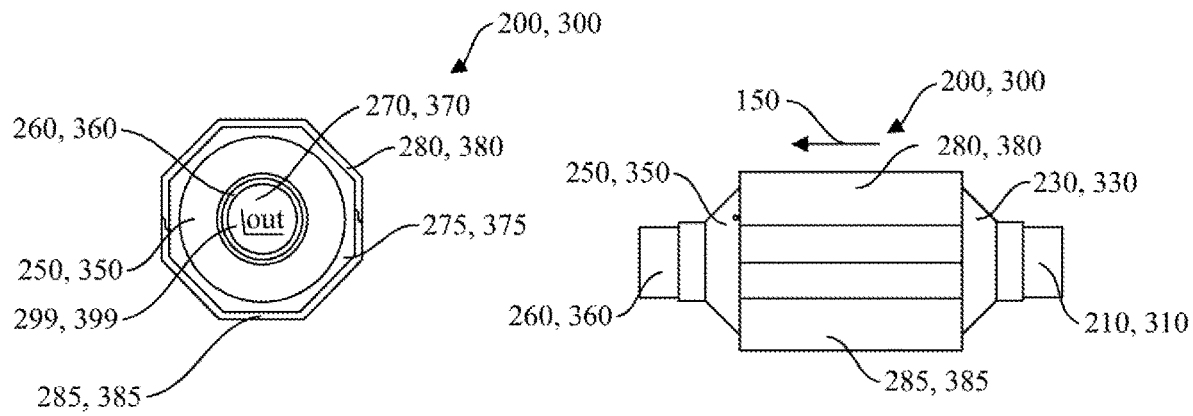
FIG. 3 is an outlet end view of the type-I hydrodynamic cavitation device of FIG. 2 according to an exemplary embodiment of the present disclosure.
FIG. 4 is a side view of the type-I hydrodynamic cavitation device of FIG. 2 according to an exemplary embodiment of the present disclosure.

FIG. 3 is an outlet end view of the type-I hydrodynamic cavitation device 200, 300 of FIG. 2 according to an exemplary embodiment of the present disclosure.

FIG. 4 is a side view of the type-I hydrodynamic cavitation device 200, 300 of FIG. 2 according to an exemplary embodiment of the present disclosure. As illustrated in FIG. 4, the predominant flow direction 150 is right-to-left (inlet-to-outlet).

Figure 5:
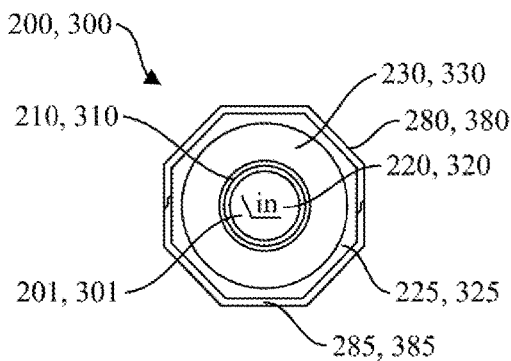
FIG. 5 is an inlet end view of the type-I hydrodynamic cavitation device of FIG. 2 according to an exemplary embodiment of the present disclosure.

FIG. 5 is an inlet end view of the type-I hydrodynamic cavitation device of FIG. 2 according to an exemplary embodiment of the present disclosure.

Figure 6:
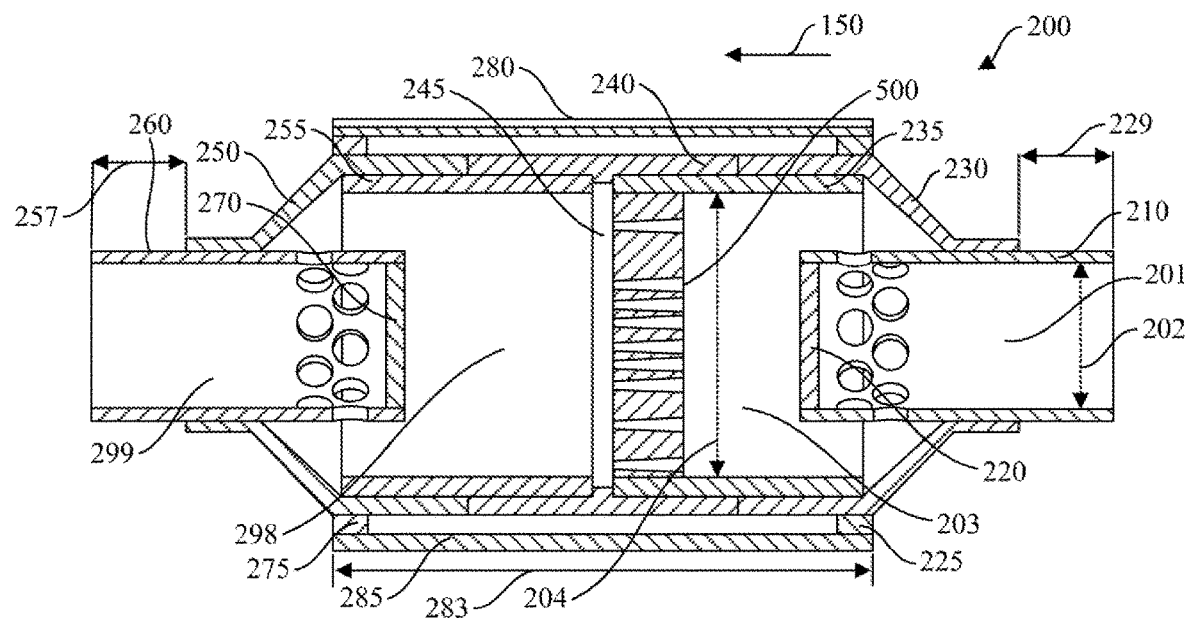
FIG. 6 is a cross-sectional side view of the type-I hydrodynamic cavitation device of FIG. 2 equipped with a type-A hydrodynamic cavitation unit according to an exemplary embodiment of the present disclosure.

FIG. 6 is a cross-sectional side view of the type-I hydrodynamic cavitation device 200 of FIG. 2 equipped with a type-A hydrodynamic cavitation unit 500 according to an exemplary embodiment of the present disclosure. The type-A hydrodynamic cavitation unit 500 will be described in greater detail hereinbelow. As illustrated in FIG. 6, the predominant flow direction 150 is right-to-left (inlet-to-outlet).

The inlet side type-X vortex unit 210 may have an inside diameter 202. The inside diameter 202 may be configured to match specifications of an inlet conduit. For example, when Schedule 40 PVC conduit is used with a pipe size of 2 in, the inside diameter 202 may be about 2.047 in (about 5.200 cm). For example, when Schedule 80 PVC conduit is used with a pipe size of 2 in, the inside diameter 202 may be about 1.913 in (about 4.859 cm). Although the type-I hydrodynamic cavitation device 200, 300 is described herein with respect to 2 in pipe size, portions of or an entirety of the type-I hydrodynamic cavitation device 200, 300 may be scaled up or down to fit any pipe size.

A radially outward surface of the inlet side type-X vortex unit 210 may be connected to a first radially inward surface of the inlet side expander 230 using any suitable means including adhesive or integrated into a single component. In an exemplary embodiment, as shown in FIG. 6, an offset 229 between an end of the inlet side type-X vortex unit 210 and an end of the inlet side expander 230 may be about 1.325 in (about 3.366 cm).

The body of the hydrodynamic cavitation device 200 may include one or more cylindrical segments. As illustrated in the exemplary embodiment of FIG. 6, the hydrodynamic cavitation device 200 may include a first cylindrical segment 235, a coupling 240, and a second cylindrical segment 255. The coupling 240 may include a ridge 245. A second radially inward surface of the inlet side expander 230 may be connected to a first radially outward surface of the first cylindrical segment 235 using any suitable means including adhesive or integrated into a single component. A first radially inward surface of the coupling 240 may be connected to a second radially outward surface of the first cylindrical segment 235 using any suitable means including adhesive or integrated into a single component. A first portion of the ridge 245 may be connected to a portion of an end surface of the first cylindrical segment 235. A radially outward surface type-A hydrodynamic cavitation unit 500 may be connected to a radially inward surface of the first cylindrical segment 235 using any suitable means including adhesive or integrated into a single component.

Each of the first cylindrical segment 235 and the second cylindrical segment 255 may have an inside diameter 204. For example, when Schedule 40 PVC conduit is used for the first cylindrical segment 235 and the second cylindrical segment 255, the pipe size may be 4 in, and the inside diameter 204 may be about 3.998 in (about 10.15 cm). For example, when Schedule 80 PVC conduit is used for the first cylindrical segment 235 and the second cylindrical segment 255, the pipe size may be 4 in, and the inside diameter 204 may be about 3.786 in (about 9.616 cm).

In some embodiments, a ratio of the inside diameter 202 of the inlet side type-X vortex unit 210 to the inside diameter 204 of the first cylindrical segment 235 and the second cylindrical segment 255 may be about 1:2. The use of "about" is intentional and used herein, for example, to account for potential variations in pipe diameters due to manufacturing tolerances, variations due to differences between pipe manufacturers, the use of different pipe schedules within a given installation, and the like. For example, using Schedule 40 PVC pipe, for an inlet conduit pipe size of 2 in and when the pipe size of the first cylindrical segment 235 and the second cylindrical segment 255 is 4 in, the ratio of the inside diameter 202 to the inside diameter 204 is 2.047:3.998 or 1:1.953, which may be referred to as "about 1:2". Additionally, for example, using Schedule 80 PVC pipe, for an inlet conduit pipe size of 2 in and when the pipe size of the first cylindrical segment 235 and the second cylindrical segment 255 is 4 in, the ratio of the inside diameter 202 to the inside diameter 204 is 1.913:3.786 or 1:1.979, which may also be referred to as "about 1:2". Whenever a ratio is expressed in the present specification, the term "about" is generally used, and the types of variations described above are understood to be within the scope of the disclosure.

The coupling 240, the outlet side reducer 250, the second cylindrical segment 255, and the outlet side type-X vortex unit 260 may be connected in substantially the same manner as described above with respect to the inlet side expander 230, the first cylindrical segment 235, and the inlet side type-X vortex unit 210. The inlet side spacer 225 may be provided between a radially outward surface of the inlet side expander 230, and a radially inward surface of the first portion 280 and the second portion 285 of the protective cover. The outlet side spacer 275 may be provided between a radially outward surface of the outlet side reducer 250, and a radially inward surface of the first portion 280 and the second portion 285 of the protective cover. In an exemplary embodiment, as shown in FIG. 6, an offset 257 between an end of the outlet side type-X vortex unit 260 and an end of the outlet side reducer 250 may be about 1.325 in (about 3.366 cm). An exemplary length 281 of the first portion 280 and the second portion 285 of the protective cover in the predominant flow direction 150 may be about 7.550 in (about 19.18 cm).

Regardless of the specific means of manufacturing, the hydrodynamic cavitation device 200 may have an inlet 201 connected in series to a first chamber 203, a second chamber 298, and an outlet 299. The type-A hydrodynamic cavitation unit 500 may be provided between the first chamber 203 and the second chamber 298.

Although the hydrodynamic cavitation device 200 is illustrated with the vortex unit 210, the cap 220, the spacer 225, the expander 230, the first cylindrical segment 235, the coupling 240, the reducer 250, the second cylindrical segment 255, the vortex unit 260, the cap 270, the spacer 275, and the type-A hydrodynamic cavitation unit 500 having substantially circular cross sections, any suitable cross-sectional shape may be used, e.g., circular, irregular, oval, oblong, eccentric, polygonal, triangular, rectangular, square, pentagonal, hexagonal, octagonal, complex (combinations of shapes), and the like.

Additionally, although the hydrodynamic cavitation device 200 is shown and described hereinabove in terms of separate components, e.g., the vortex unit 210, the cap 220, the spacer 225, the expander 230, the first cylindrical segment 235, the coupling 240, the reducer 250, the second cylindrical segment 255, the vortex unit 260, the cap 270, the spacer 275, the first portion 280 of the protective cover, the second portion 285 of the protective cover, and the type-A hydrodynamic cavitation unit 500, one or more of, e.g., the vortex unit 210, the cap 220, the spacer 225, the expander 230, the first cylindrical segment 235, the coupling 240, the reducer 250, the second cylindrical segment 255, the vortex unit 260, the cap 270, the spacer 275, the first portion 280 of the protective cover, the second portion 285 of the protective cover, and the type-A hydrodynamic cavitation unit 500, may be combined or integrated into one or more unitary bodies. For example, in an exemplary embodiment, the expander 230, the first cylindrical segment 235, the reducer 250, and the second cylindrical segment 255 may be formed by injection molding and integrated into a unitary body. In such exemplary embodiment, a radially inward surface of the expander 230 may be directly connected to a first pipe (e.g., conduit 45) connected to a source of water containing impurities, and a radially inward surface of the reducer 250 may be directly connected to a second pipe (e.g., conduit 47) connected to a destination (e.g., swimming pool, spa, pond, water feature (e.g., fountain), water park, or the like) for the water passing through the hydrodynamic cavitation device 200.

Figure 7:
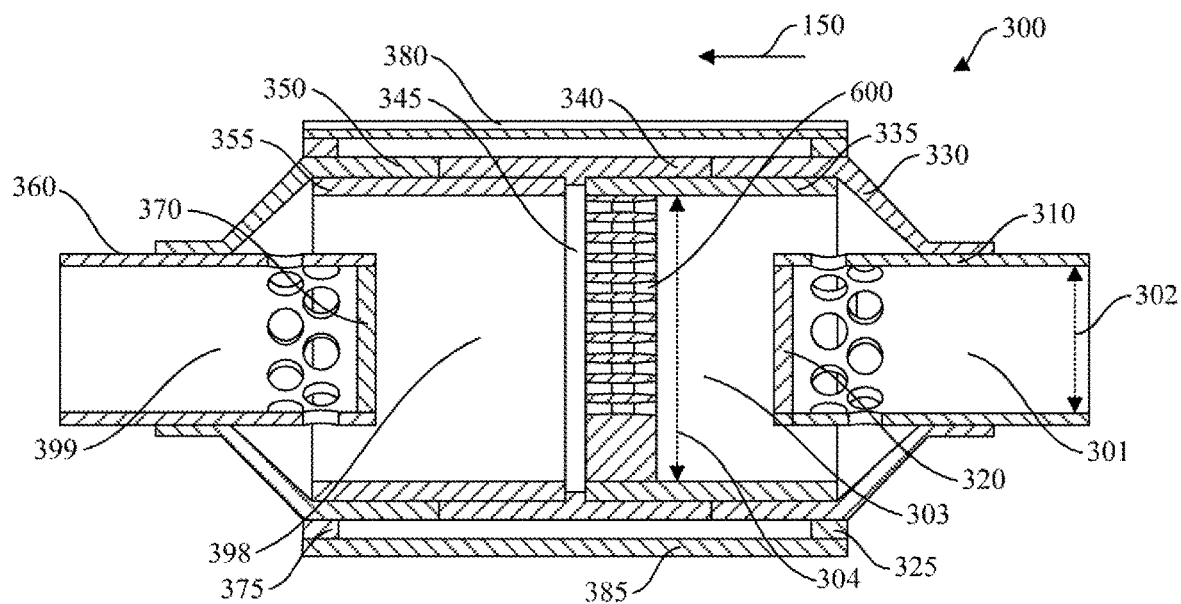
FIG. 7 is a cross-sectional side view of the type-I hydrodynamic cavitation device of FIG. 2 equipped with a type-B hydrodynamic cavitation unit according to an exemplary embodiment of the present disclosure.

FIG. 7 is a cross-sectional side view of the type-I hydrodynamic cavitation device 300 of FIG. 2 equipped with a type-B hydrodynamic cavitation unit according to an exemplary embodiment of the present disclosure. The type-B hydrodynamic cavitation unit 600 will be described in greater detail hereinbelow. Other than the type-A hydrodynamic cavitation unit 500, the type-I hydrodynamic cavitation device 300 of FIG. 7 may be generally similar to the type-I hydrodynamic cavitation device 200 of FIG. 6. Like features and structures and are labeled in FIG. 7 with like reference numbers to those of FIG. 6 except that a format of 3XX is used instead of a format of 2XX, where XX are the second and third digits of the reference number. As illustrated in FIG. 7, the predominant flow direction 150 is right-to-left (inlet-to-outlet).

Figure 8:
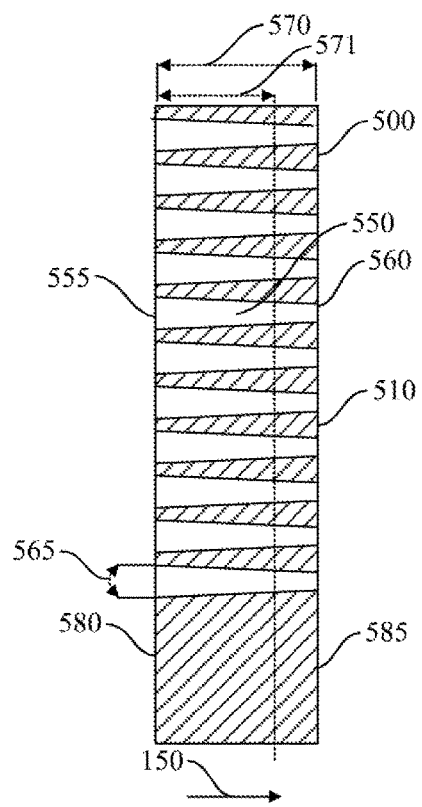
FIG. 8 is a cross-sectional side view of the type-A hydrodynamic cavitation unit (including type-α openings) of FIG. 6 of the type-I hydrodynamic cavitation device of FIG. 2 according to an exemplary embodiment of the present disclosure.

FIG. 8 is a cross-sectional side view of the type-A hydrodynamic cavitation unit 500 (including one or more type-α openings 550) of FIG. 6 of the type-I hydrodynamic cavitation device 200 of FIG. 2 according to an exemplary embodiment of the present disclosure. The type-A hydrodynamic cavitation unit 500 may be configured to permit fluid, such as water, to flow therethrough. The type-A hydrodynamic cavitation unit 500 may be configured to produce hydrodynamic cavitation within the type-A hydrodynamic cavitation unit 500 and/or in relatively close proximity downstream of the type-A hydrodynamic cavitation unit 500.

As illustrated in FIG. 8, the predominant flow direction 150 is left-to-right (inlet-to-outlet) (the opposite of that shown in FIGS. 4, 6 and 7). The type-A hydrodynamic cavitation unit 500 may have any suitable shape or size. The type-A hydrodynamic cavitation unit 500 may be configured to substantially fill an interior of the type-I hydrodynamic cavitation device 200.

In an exemplary embodiment, the type-A hydrodynamic cavitation unit 500 may have a disc shape with a thickness 570 in the predominant flow direction 150. The thickness 570 may be any suitable length. A ratio of the thickness 570 with respect to an inside diameter of an inlet pipe (e.g., conduit 45) may be about 1:2. A ratio of the thickness 570 with respect to the inside diameter 202 of the inlet side type-X vortex unit 210 may be about 1:2. A ratio of the thickness 570 with respect to a largest dimension (e.g., a diameter) of the first chamber 203 may be about 1:4. A ratio of the thickness 570 with respect to the inside diameter 204 of the first cylindrical segment 235 may be about 1:4. In an exemplary embodiment, the thickness 570 may be about 1.000 in (about 2.54 cm).

The type-A hydrodynamic cavitation unit 500 may have an inlet surface 580 oriented to generally face the inlet 201. The type-A hydrodynamic cavitation unit 500 may have an outlet surface 585 oriented to generally face the outlet 299. The inlet surface 580 and the outlet surface 585 may be disposed to be substantially perpendicular to the predominant flow direction 150. The inlet surface 580 and the outlet surface 585 may be substantially flat (as illustrated), curved or have any other suitable profile.

The one or more type-α openings 550 may be configured to extend from the inlet surface 580 to the outlet surface 585. The one or more type-α openings 550 may be configured to produce hydrodynamic cavitation within the one or more type-α openings 550 and/or in relatively close proximity downstream of the one or more type-α openings 550.

The one or more type-α openings 550 may have a tapered shape (as shown, e.g., in FIG. 8). The one or more type-α openings 550 may have a frustoconical shape. The one or more type-α openings 550 may have an inlet 555 and an outlet 560. The inlet 555 may have a cross-sectional area larger than a cross-sectional area of the outlet 560. The sidewalls of the one or more frustoconical type-α openings 550 may be configured so that the sidewalls define imaginary lines that, when extended to cross at a center of an imaginary circle, form an angle 565 in a range of greater than or equal to about 2° to less than or equal to about 5°. As shown, for example, in FIG. 8, the angle 565 may be about 3°.

Figure 9:
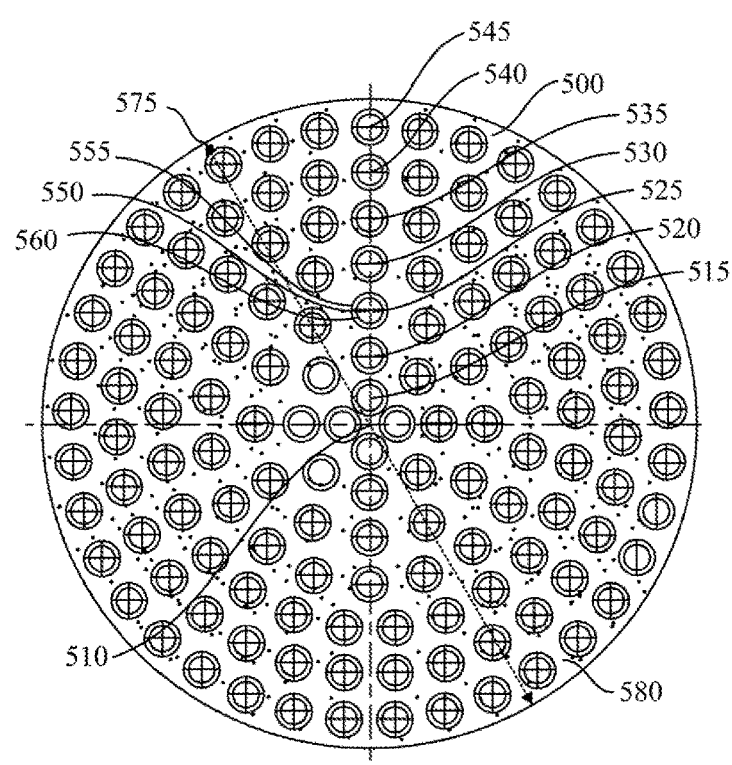
FIG. 9 is an inlet end view of the type-A hydrodynamic cavitation unit of FIG. 6 of the type-I hydrodynamic cavitation device of FIG. 2 according to an exemplary embodiment of the present disclosure.

FIG. 9 is an inlet end view of the type-A hydrodynamic cavitation unit 500 of FIG. 6 of the type-I hydrodynamic cavitation device 200 of FIG. 2 according to an exemplary embodiment of the present disclosure. A cross-sectional area of the inlet 555 may be circular (as shown, e.g., in FIG. 9). The diameter of the inlet 555 may be about 0.212 in (about 0.538 cm), and a cross-sectional area of the inlet 555 may be about 0.035 in$^2$ (about 0.228 cm$^2$). A cross-sectional area of the outlet 560 may be circular (as shown, e.g., in FIG. 9). The diameter of the outlet 560 may be about 0.160 in (about 0.406 cm), and a cross-sectional area of the outlet 560 may be about 0.0201 in$^2$ (about 0.130 cm$^2$). The cross-section of the inlet 555 and the cross-section of the outlet 560 may have a common axis. The inlet 555 and the outlet 560 may be concentric as shown, e.g., in FIG. 9.

The type-A hydrodynamic cavitation unit 500 may have a circular cross-sectional shape with an axis 510. For example, as shown in FIG. 9, type-A hydrodynamic cavitation unit 500 may have a diameter 575 of about 3.970 in (about 10.08 cm), which is suitable for engagement with the inside diameter 204 of the first cylindrical segment 235 when the first cylindrical segment 235 is formed from Schedule 40 PVC pipe having a pipe size of 4 in. An inside diameter of the Schedule 40 PVC pipe having the pipe size of 4 in is about 3.998 in (about 10.14 cm). As such, in an exemplary embodiment, a gap of about 0.028 in (about 0.071 cm or about 0.71 mm), which is suitable for adhesive.

The type-A hydrodynamic cavitation unit 500 may have a plurality of type-α openings 550. The plurality of type-α openings 550 may be arranged in any suitable configuration or pattern. For example, as shown in FIG. 9, the plurality of type-α openings 550 may be arranged in a plurality of generally concentric rings 515, 520, 525, 530, 535, 540 and 545 about the axis 510 of the type-A hydrodynamic cavitation unit 500. The ring 515 may include 4 type-α openings 550, each having a center located a spaced distance of about 0.165 in (about 0.419 cm) from the axis 510, and each being spaced about 90° apart. The ring 520 may include 8 type-α openings 550, each having a center located a spaced distance of about 0.415 in (about 1.05 cm) from the axis 510, and each being spaced about 45° apart. The ring 525 may include 12 type-α openings 550, each having a center located a spaced distance of about 0.695 in (about 1.77 cm) from the axis 510, and each being spaced about 30° apart. The ring 530 may include 18 type-α openings 550, each having a center located a spaced distance of about 0.975 in (about 2.48 cm) from the axis 510, and each being spaced about 20° apart. The ring 535 may include 25 type-α openings 550, each having a center located a spaced distance of about 1.255 in (about 3.19 cm) from the axis 510, and each being spaced about 14.4° apart. The ring 540 may include 31 type-α openings 550, each having a center located a spaced distance of about 1.535 in (about 3.90 cm) from the axis 510, and each being spaced about 11.6° apart. The ring 545 may include 37 type-α openings 550, each having a center located a spaced distance of about 1.815 in (about 4.61 cm) from the axis 510, and each being spaced about 9.7° apart.

In an exemplary embodiment, as shown in FIG. 9, the type-A hydrodynamic cavitation unit 500 may have 135 type-α openings 550. A total cross-sectional area of the 135 type-α openings 550 on the inlet surface 580 may be about 4.77 in$^2$ (about 30.7 cm$^2$). A total cross-sectional area of the 135 type-α openings 550 on the outlet surface 585 may be about 2.71 in$^2$ (about 17.5 cm$^2$). The total cross-sectional area of the 135 type-α openings 550 may linearly vary from the inlet surface 580 to the outlet surface 585.

As shown, for example, in FIG. 8, an intermediate point 571 may be located a spaced distance of about 0.792 in (about 2.01 cm) from the inlet 555 in the predominant flow direction 150 of the type-A hydrodynamic cavitation unit 500. The intermediate point 571 may be provided to satisfy a ratio of the spaced distance from the inlet to a spaced distance from the outlet 560 of about 4:1. At the intermediate point 571, a total cross-sectional area of the 135 type-α openings 550 may be about 3.14 in$^2$ (about 20.3 cm$^2$). A ratio of the total cross-sectional area of the 135 type-α openings 550 to a cross-sectional area of the inside diameter 202 may be about 1:1 (i.e., equal). The ratio of about 1:1 at the intermediate point 571 promotes hydrodynamic cavitation within the type-A hydrodynamic cavitation unit 500 and/or in relatively close proximity downstream of the type-A hydrodynamic cavitation unit 500. The hydrodynamic cavitation unit 500 configured with the 1:1 ratio may generate hydrodynamic cavitation in response to the fluid communication at a rate of greater than about 10 gallons (about 38 L) per minute and less than about 110 gallons (about 416 L) per minute.

Figure 10:
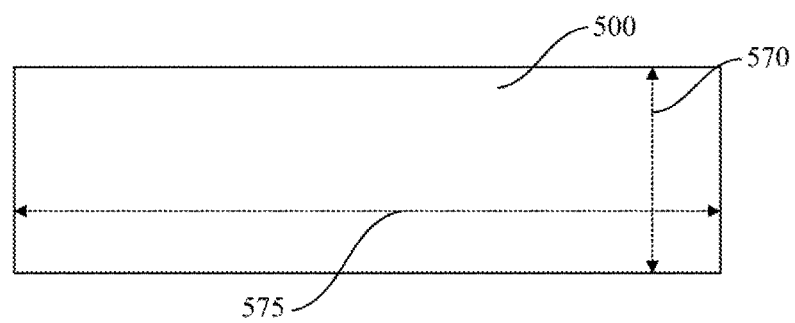
FIG. 10 is a side view of the type-A hydrodynamic cavitation unit of FIG. 6 of the type-I hydrodynamic cavitation device of FIG. 2 according to an exemplary embodiment of the present disclosure.

FIG. 10 is a side view of the type-A hydrodynamic cavitation unit 500 of FIG. 6 of the type-I hydrodynamic cavitation device 200 of FIG. 2 according to an exemplary embodiment of the present disclosure.

Figure 11:
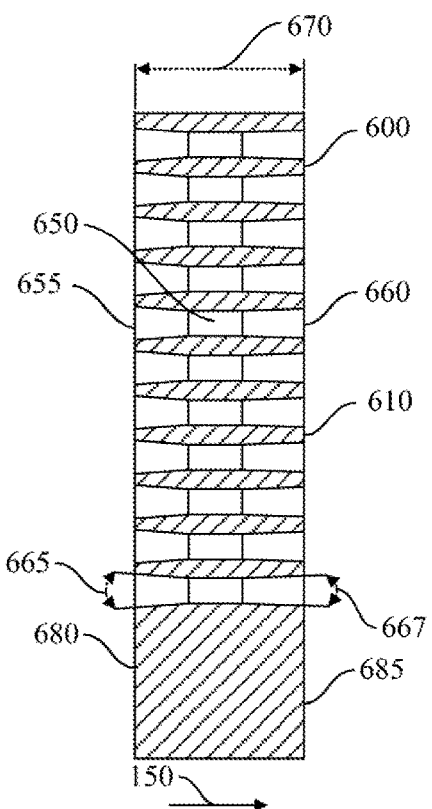
FIG. 11 is a cross-sectional side view of the type-B hydrodynamic cavitation unit (including type-β openings) of FIG. 7 of the type-I hydrodynamic cavitation device of FIG. 2 according to an exemplary embodiment of the present disclosure.
Figure 12:
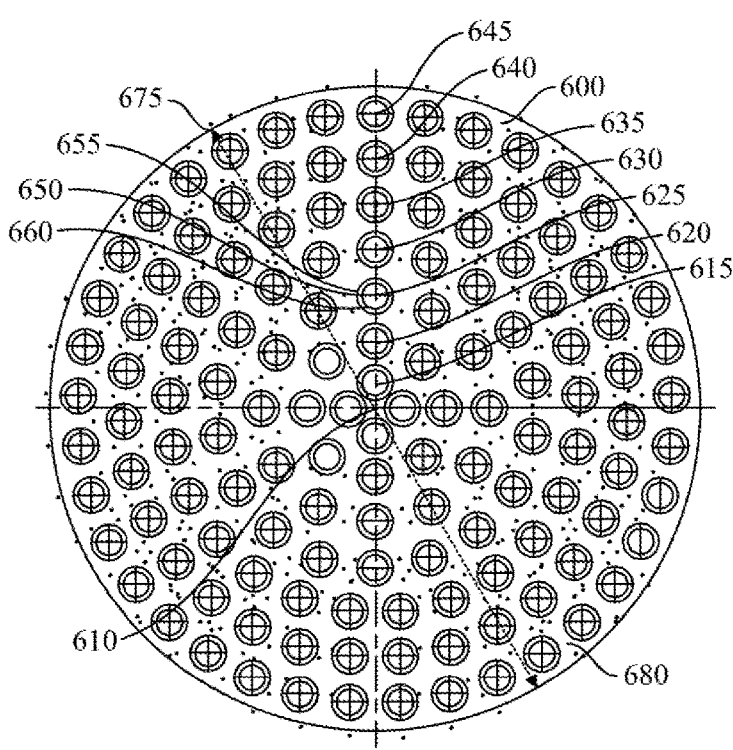
FIG. 12 is an inlet end view of the type-B hydrodynamic cavitation unit of FIG. 7 of the type-I hydrodynamic cavitation device of FIG. 2 according to an exemplary embodiment of the present disclosure.
Figure 13:
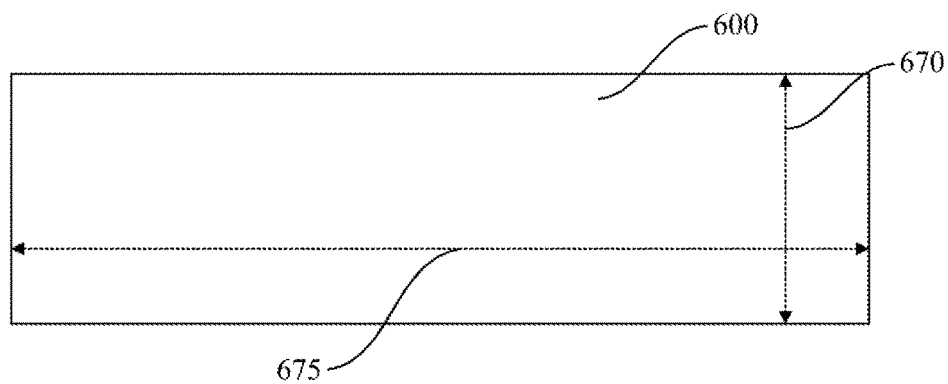
FIG. 13 is a side view of the type-B hydrodynamic cavitation unit of FIG. 7 of the type-I hydrodynamic cavitation device of FIG. 2 according to an exemplary embodiment of the present disclosure.

FIG. 11 is a cross-sectional side view of the type-B hydrodynamic cavitation unit 600 (including one or more type-β openings 650) of FIG. 8 of the type-I hydrodynamic cavitation device 300 of FIG. 2 according to an exemplary embodiment of the present disclosure. FIG. 12 is an inlet end view of the type-B hydrodynamic cavitation unit 600 of FIG. 7 of the type-I hydrodynamic cavitation device 300 of FIG. 2 according to an exemplary embodiment of the present disclosure. FIG. 13 is a side view of the type-B hydrodynamic cavitation unit 600 of FIG. 7 of the type-I hydrodynamic cavitation device 300 of FIG. 2 according to an exemplary embodiment of the present disclosure.

Other than the one or more type-β openings 650, the type-B hydrodynamic cavitation unit 600 of FIGS. 11-13 may be generally similar to the type-A hydrodynamic cavitation unit 500 of FIGS. 8-10, respectively. Like features and structures and are labeled in FIGS. 11-13 with like reference numbers to those of FIGS. 8-10, respectively, except that a format of 6XX is used instead of a format of 5XX, where XX are the second and third digits of the reference number. As illustrated in FIG. 11, the predominant flow direction 150 is left-to-right (inlet-to-outlet). Structural differences between the type-B hydrodynamic cavitation unit 600 of FIGS. 11-13 and the type-A hydrodynamic cavitation unit 500 of FIGS. 8-10 are evident in FIG. 14.

Figure 14:
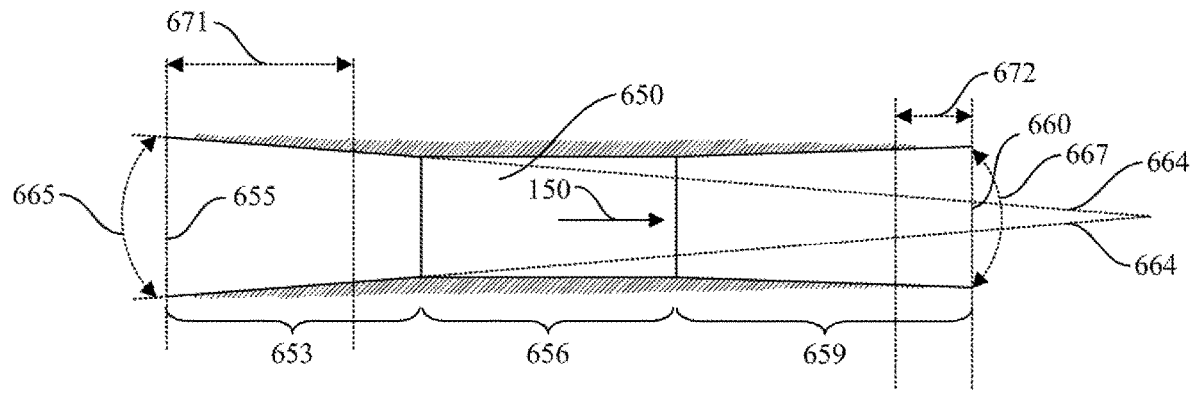
FIG. 14 is a cross-sectional side view of the type-β opening of the type-B hydrodynamic cavitation unit of FIG. 7 of the type-I hydrodynamic cavitation device of FIG. 2 according to an exemplary embodiment of the present disclosure.

FIG. 14 is a cross-sectional side view of an exemplary type-β opening 650 of the type-B hydrodynamic cavitation unit 600 of FIG. 7 of the type-I hydrodynamic cavitation device 300 of FIG. 2 according to an exemplary embodiment of the present disclosure. As illustrated in FIG. 14, the predominant flow direction 150 is left-to-right (inlet-to-outlet).

The type-B hydrodynamic cavitation unit 600 may be configured to permit fluid, such as water, to flow therethrough. The type-B hydrodynamic cavitation unit 600 may be configured to produce hydrodynamic cavitation within the type-B hydrodynamic cavitation unit 600 and/or in relatively close proximity downstream of the type-B hydrodynamic cavitation unit 600.

The type-B hydrodynamic cavitation unit 600 may have any suitable shape or size. The type-B hydrodynamic cavitation unit 600 may be configured to substantially fill an interior of the type-I hydrodynamic cavitation device 300.

In an exemplary embodiment, the type-B hydrodynamic cavitation unit 600 may have a disc shape with a thickness 670 in the predominant flow direction 150. The thickness 670 may be any suitable length. A ratio of the thickness 670 with respect to an inside diameter of an inlet pipe (e.g., conduit 45) may be about 1:2. A ratio of the thickness 670 with respect to the inside diameter 302 of the inlet side type-X vortex unit 310 may be about 1:2. A ratio of the thickness 670 with respect to a largest dimension (e.g., a diameter) of the first chamber 303 may be about 1:4. A ratio of the thickness 670 with respect to the inside diameter 304 of the first cylindrical segment 335 may be about 1:4. In an exemplary embodiment, the thickness 670 may be about 1.000 in (about 2.54 cm).

The type-B hydrodynamic cavitation unit 600 may have an inlet surface 680 oriented to generally face the inlet 301. The type-B hydrodynamic cavitation unit 600 may have an outlet surface 685 oriented to generally face the outlet 399. The inlet surface 680 and the outlet surface 685 may be disposed to be substantially perpendicular to the predominant flow direction 150. The inlet surface 680 and the outlet surface 685 may be substantially flat (as illustrated), curved or have any other suitable profile.

The one or more type-β openings 650 may be configured to extend from the inlet surface 680 to the outlet surface 685. The one or more type-β openings 650 may be configured to produce hydrodynamic cavitation within the one or more type-β openings 650 and/or in relatively close proximity downstream of the one or more type-β openings 650.

The one or more type-β openings 650 may have an inlet 655 and an outlet 660. The inlet 655 may have a cross-sectional area larger than a cross-sectional area of the outlet 660. The one or more type-β openings 650 may have a curved shape. The curved shape may be substantially smooth along at least a portion of the length of the one or more type-β openings 650. The one or more type-β openings 650 may have a Venturi shape (as shown, e.g., in FIG. 14). The one or more Venturi shape type-β openings 650 may have an inlet region 653 adjacent to the inlet 665, a throat region 656, and an outlet region 659 adjacent to the outlet 660. A length of the inlet region 653 may be substantially the same length in the predominant flow direction 150 as the throat region 656. A length of each of the inlet region 653 and the throat region 656 may be less than a length of the outlet region 659. Instead of the substantially smooth curved shape as shown in FIG. 14, the one or more type-β openings 650 may have a multi-part segmented shape consisting of substantially straight sidewall segments with points of inflection therebetween, e.g., a first substantially straight, tapered sidewall in the inlet region 653, a second substantially straight, non-tapered sidewall in the throat region 656, and a third substantially straight, tapered sidewall in the outlet region 659.

With reference, for example, to the left side of FIG. 14, the sidewalls of the one or more Venturi shape type-β openings 650 may be configured so that points (described below) along the Venturi shape type-β openings 650 define imaginary lines that, when extended to cross at a center of an imaginary circle, form an angle 665 in a range of greater than or equal to about 8° to less than or equal to about 12°. As shown, for example, in FIG. 14, the angle 665 may be about 9.9°. The angle 665 may be composed of imaginary lines 664 that extend from an edge of the inlet 655 (upper-left or lower-left of FIG. 14) to a transition point between the inlet region 653 and the throat region 656 and further extend to cross at a center (far right side of FIG. 14) of an imaginary circle.

With reference, for example, to the right side of FIG. 14, the sidewalls of the one or more Venturi shape type-β openings 650 may be configured so that points (described below) along the Venturi shape type-β openings 650 define imaginary lines that, when extended to cross at a center of an imaginary circle, form an angle 667 in a range of greater than or equal to about 2° to less than or equal to about 5°. As shown, for example, in FIG. 14, the angle 667 may be about 2.5°. The angle 667 may be composed of imaginary lines (not shown but similar to lines 664) that extend from an edge of the outlet 660 (upper-right or lower-right of FIG. 14) to a transition point between the throat region 656 and the outlet region 659 and further extend to cross at a center (not shown but would occur off the page past the left side of FIG. 14) of an imaginary circle.

A ratio of the angle 665 to the angle 667 may be about 1:1 (i.e., equal) to about 6:1. For example, when the angle 665 is about 12° and the angle 667 is about 2°, the ratio is 6:1. As shown in FIG. 14, the ratio of the angle 665 to the angle 667 may be about 4:1 (i.e., e.g., about 9.9°:2.5° equals a ratio of about 4:1).

The inlet region 653 may have a length in the predominant flow direction 150 of about 0.300 in (about 0.762 cm). The throat region 656 may have a length in the predominant flow direction 150 of about 0.300 in. The outlet region 659 may have a length in the predominant flow direction 150 of about 0.350 in (about 0.889 cm). A ratio of the length of the inlet region 653 to the length of the throat region 656 may be about 1:1 (i.e., equal); a ratio of the length of the inlet region 653 to the length of the outlet region 659 may be about 1:1.16 (i.e., e.g., about 0.300:0.350 equals a ratio of about 1:1.16); and a ratio of the length of the throat region 656 to the length of the outlet region 659 may be about 1:1.16.

The type-B hydrodynamic cavitation unit 600 may have a plurality of type-β openings 650. The plurality of type-β openings 650 may be arranged in any suitable configuration or pattern. For example, as shown in FIG. 12, the plurality of type-β openings 650 may be arranged in a plurality of generally concentric rings 615, 620, 625, 630, 635, 640 and 645 about the axis 610 of the type-B hydrodynamic cavitation unit 600. The ring 615 may include 4 type-β openings 650, each having a center located a spaced distance of about 0.165 in (about 0.419 cm) from the axis 610, and each being spaced about 90° apart. The ring 620 may include 8 type-β openings 650, each having a center located a spaced distance of about 0.415 in (about 1.05 cm) from the axis 610, and each being spaced about 45° apart. The ring 625 may include 12 type-β openings 650, each having a center located a spaced distance of about 0.695 in (about 1.77 cm) from the axis 610, and each being spaced about 30° apart. The ring 630 may include 18 type-β openings 650, each having a center located a spaced distance of about 0.975 in (about 2.48 cm) from the axis 610, and each being spaced about 20° apart. The ring 635 may include 25 type-β openings 650, each having a center located a spaced distance of about 1.255 in (about 3.19 cm) from the axis 610, and each being spaced about 14.4° apart. The ring 640 may include 31 type-β openings 650, each having a center located a spaced distance of about 1.535 in (about 3.90 cm) from the axis 610, and each being spaced about 11.6° apart. The ring 645 may include 37 type-β openings 650, each having a center located a spaced distance of about 1.815 in (about 4.61 cm) from the axis 610, and each being spaced about 9.7° apart.

In an exemplary embodiment, as shown in FIG. 12, the type-B hydrodynamic cavitation unit 600 may have 135 type-β openings 650. A total cross-sectional area of the 135 type-β openings 650 on the inlet surface 680 may be about 4.77 in$^2$ (about 30.7 cm$^2$). A total cross-sectional area of the 135 type-β openings 650 on the outlet surface 685 may be about 2.71 in$^2$ (about 17.5 cm$^2$). The total cross-sectional area of the 135 type-β openings 650 may vary from the inlet surface 680 to the outlet surface 685.

As shown, for example, in FIG. 14, a first intermediate point 671 may be located a spaced distance of about 0.231 in (about 0.586 cm) from the inlet 655 in the predominant flow direction 150 of the type-B hydrodynamic cavitation unit 600. The first intermediate point 671 may be provided to satisfy a ratio of the spaced distance from the inlet 655 to a spaced distance from the throat region 656 of between about 3:1 to about 4:1. A second intermediate point 672 may be located a spaced distance of about 0.0875 in (about 0.222 cm) from the outlet 667 in the predominant flow direction 150 of the type-B hydrodynamic cavitation unit 600. The second intermediate point 672 may be provided to satisfy a ratio of the spaced distance from the outlet 667 to a spaced distance from the throat region 656 of about 1:3. At each of the intermediate point 671 and the intermediate point 672, a total cross-sectional area of the 135 type-β openings 650 may be about 3.14 in$^2$ (about 20.3 cm$^2$). A ratio of the total cross-sectional area of the 135 type-β openings 650 to a cross-sectional area of the inside diameter 302 may be about 1:1 (i.e., equal). The ratio of about 1:1 at each of the intermediate point 671 and the intermediate point 672 promotes hydrodynamic cavitation within the type-B hydrodynamic cavitation unit 600 and/or in relatively close proximity downstream of the type-B hydrodynamic cavitation unit 600. The hydrodynamic cavitation unit 600 configured with the 1:1 ratio may generate hydrodynamic cavitation in response to the fluid communication at a rate of greater than about 10 gallons (about 38 L) per minute and less than about 110 gallons (about 416 L) per minute.

Figure 15:
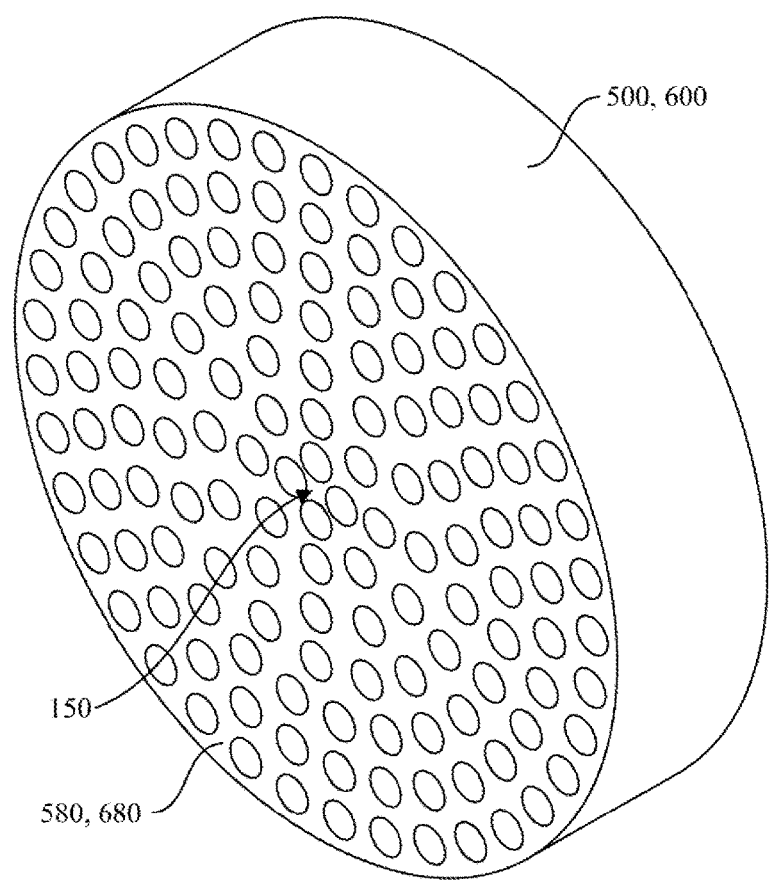
FIG. 15 is a perspective inlet end view of the type-A or type-B hydrodynamic cavitation unit of FIG. 6 or FIG. 7, respectively, of the type-I hydrodynamic cavitation device of FIG. 2 according to an exemplary embodiment of the present disclosure.

FIG. 15 is a perspective inlet end view of the type-A or type-B hydrodynamic cavitation unit 500, 600 of FIG. 6 or FIG. 7, respectively, of the type-I hydrodynamic cavitation device 200, 300 of FIG. 2 according to an exemplary embodiment of the present disclosure.

Figure 16:
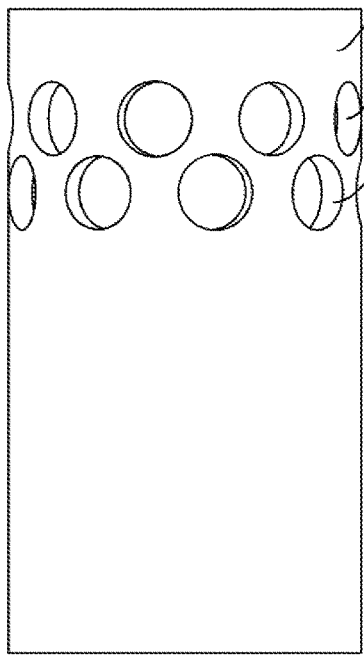
FIG. 16 is a side view of a type-X vortex unit of the type-I hydrodynamic cavitation device of FIG. 2 according to an exemplary embodiment of the present disclosure.
Figure 17:
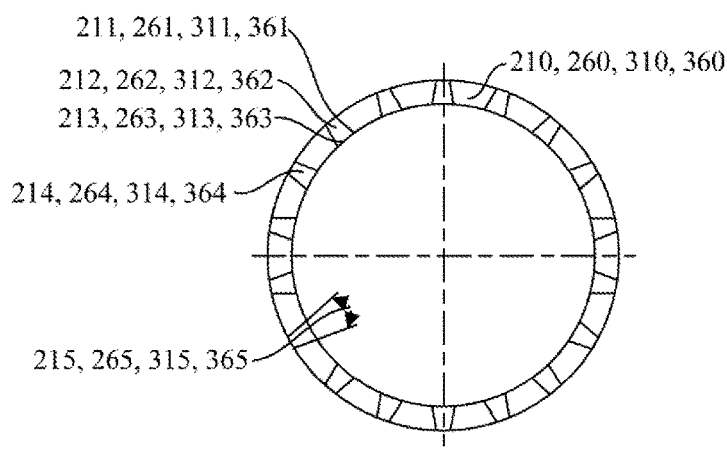
FIG. 17 is a cross-sectional view of the type-X vortex unit of the type-I hydrodynamic cavitation device of FIG. 2 according to an exemplary embodiment of the present disclosure.
Figure 18:
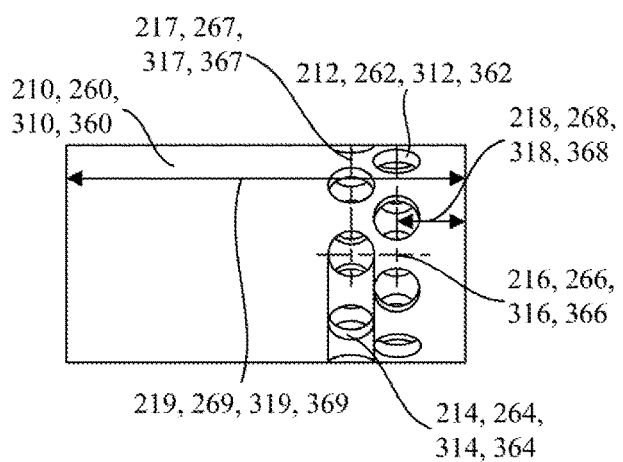
FIG. 18 is another side view of the type-X vortex unit of the type-I hydrodynamic cavitation device of FIG. 2 according to an exemplary embodiment of the present disclosure.
Figure 19:
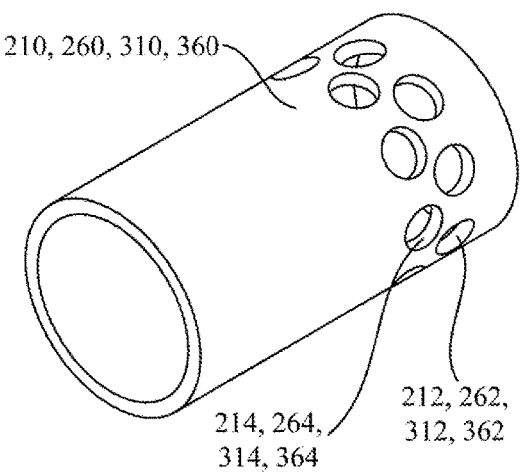
FIG. 19 is a perspective view of the type-X vortex unit of the type-I hydrodynamic cavitation device of FIG. 2 according to an exemplary embodiment of the present disclosure.

FIG. 16 is a side view of a type-X vortex unit 210, 260, 310, 360 of the type-I hydrodynamic cavitation device 200, 300 of FIG. 2 according to an exemplary embodiment of the present disclosure. FIG. 17 is a cross-sectional view of the type-X vortex unit 210, 260, 310, 360 of the type-I hydrodynamic cavitation device 200, 300 of FIG. 2 according to an exemplary embodiment of the present disclosure. FIG. 18 is another side view of the type-X vortex unit 210, 260, 310, 360 of the type-I hydrodynamic cavitation device 200, 300 of FIG. 2 according to an exemplary embodiment of the present disclosure. FIG. 19 is a perspective view of the type-X vortex unit 210, 260, 310, 360 of the type-I hydrodynamic cavitation device 200, 300 of FIG. 2 according to an exemplary embodiment of the present disclosure.

The type-X vortex unit 210, 260, 310, 360 may include one or more type-γ openings having any suitable shape, size and configuration. In an exemplary embodiment, as shown in FIGS. 16-19, the one or more type-γ openings may include a first row of 9 type-γ openings 212, 262, 312, 362 and a second row of 9 type-γ openings 214, 264, 314, 364. Each of the first row of 9 type-y openings 212, 262, 312, 362 may have an inlet and an outlet. Each of the second row of 9 type-y openings 214, 264, 314, 364 may have an inlet and an outlet. The inlet side type-X vortex unit 210, 310 may be configured to change the predominant flow direction 150 to a direction perpendicular to the predominant flow direction 150 into the chamber 203, 303. A vortex or a region of turbulent flow may form within the chamber 203, 303. Conversely, the outlet side type-X vortex unit 260, 360 may be configured to change the direction perpendicular to the predominant flow direction 150 to the predominant flow direction 150.

An inlet side type-X vortex unit 210, 310 may be configured so that each of the first row of 9 type-γ openings 212, 312 and the second row of 9 type-γ openings 214, 314 has an inlet 213, 313 and an outlet 211, 311. An outlet side type-X vortex unit 260, 360 may be configured so that each of the first row of 9 type-γ openings 262, 362 and the second row of 9 type-γ openings 264, 364 has an inlet 261, 361 and an outlet 263, 363.

In an exemplary embodiment, as shown in FIGS. 16, 18 and 19, each of the first row of 9 type-γ openings 212, 262, 312, 362 may have a circular cross-sectional shape and a diameter of about 0.500 in (about 1.27 cm). Each of the second row of 9 type-γ openings 214, 264, 314, 364 may have a circular cross-sectional shape and a diameter of about 0.500 in (about 1.27 cm).

In an exemplary embodiment, as shown in FIG. 17, each of the first row of 9 type-y openings 212, 262, 312, 362 may have a frustoconical shape. Each of the second row of 9 type-y openings 214, 264, 314, 364 may have a frustoconical shape. The inlet side type-X vortex unit 210, 310 may be configured so that each of the first row of 9 type-γ openings 212, 312 and the second row of 9 type-γ openings 244, 314 has an inlet 213, 313 and an outlet 211, 311. A diameter of the inlet 213, 313 may be larger than a diameter of the outlet 211, 311. Sidewalls of the one or more frustoconical type-γ openings 212, 214, 312, 314 may be configured so that the sidewalls define imaginary lines that, when extended to cross at a center of an imaginary circle, form an angle 215, 315 in a range of greater than or equal to about 2° to less than or equal to about 5°. As shown, for example, in FIG. 17, the angle 215, 315 may be about 3°.

The outlet side type-X vortex unit 260, 360 may be configured so that each of the first row of 9 type-γ openings 262, 362 and the second row of 9 type-γ openings 244, 364 has an outlet 263, 363 and an inlet 261, 361. A diameter of the outlet 263, 363 may be larger than a diameter of the inlet 261, 361. Sidewalls of the one or more frustoconical type-γ openings 262, 264, 362, 364 may be configured so that the sidewalls define imaginary lines that, when extended to cross at a center of an imaginary circle, form an angle 265, 365 in a range of greater than or equal to about 2° to less than or equal to about 5°. As shown, for example, in FIG. 17, the angle 265, 365 may be about 3°.

A total area of the first row of 9 type-γ openings 212, 262, 312, 362 and the second row of 9 type-γ openings 214, 264, 314, 364 may be greater than a cross-sectional area of an inlet conduit (e.g., conduit 45). A total area of the first row of 9 type-γ openings 212, 262, 312, 362 and the second row of 9 type-γ openings 214, 264, 314, 364 may be greater than a cross-sectional area of the inside diameter 202. For example, when Schedule 40 PVC conduit is used with a pipe size of 2 in, the inside diameter 202 may be about 2.047 in (about 5.200 cm), and a cross-sectional area may be about 3.291 in$^2$ (about 21.23 cm$^2$). The total area of the first row of 9 type-γ openings 212, 262, 312, 362 and the second row of 9 type-γ openings 214, 264, 314, 364 may be about 3.534 in$^2$ (about 22.80 cm$^2$), which is greater than the above-referenced exemplary cross-sectional area of the inside diameter 202. As such, the first row of 9 type-γ openings 212, 262, 312, 362 and the second row of 9 type-γ openings 214, 264, 314, 364 may not create back pressure and negatively impact downstream hydrodynamic cavitation.

The first row of 9 type-γ openings 212, 262, 312, 362 may be offset from the second row of 9 type-γ openings 214, 264, 314, 364. The offset between the first row of 9 type-γ openings 212, 262, 312, 362 and the second row of 9 type-γ openings 214, 264, 314, 364 may be about 20°. The first row of 9 type-γ openings 212, 262, 312, 362 may be arranged concentrically about a circumference of the type-X vortex unit 210, 260, 310, 360 about 40° apart from each other. The second row of 9 type-γ openings 214, 264, 314, 364 may be arranged concentrically about a circumference of the type-X vortex unit 210, 260, 310, 360 about 40° apart from each other. An imaginary line 216, 266, 316, 366 through a center of each of the first row of 9 type-γ openings 212, 262, 312, 362 may be offset from an imaginary line 217, 267, 317, 367 through a center of the second row of 9 type-γ openings 214, 264, 314, 364 by about 0.500 in (about 1.27 cm). An exemplary offset 218, 268, 318, 368 between an end of the type-X vortex unit 210, 260, 310, 360 and the imaginary line 216, 266, 316, 366 in the predominant flow direction 150 may be about 0.750 in (about 1.91 cm). An exemplary length 219, 269, 319, 369 of the type-X vortex unit 210, 260, 310, 360 in the predominant flow direction 150 may be about 4.364 in (about 11.08 cm).

Figure 20:
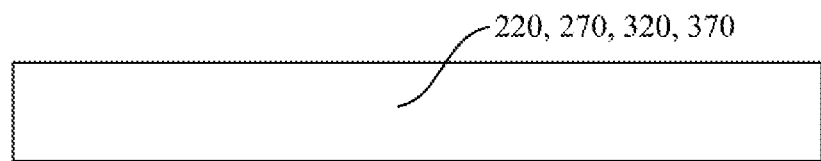
FIG. 20 is a side view of a cap of the type-X vortex unit of the type-I hydrodynamic cavitation device of FIG. 2 according to an exemplary embodiment of the present disclosure.
Figure 21:
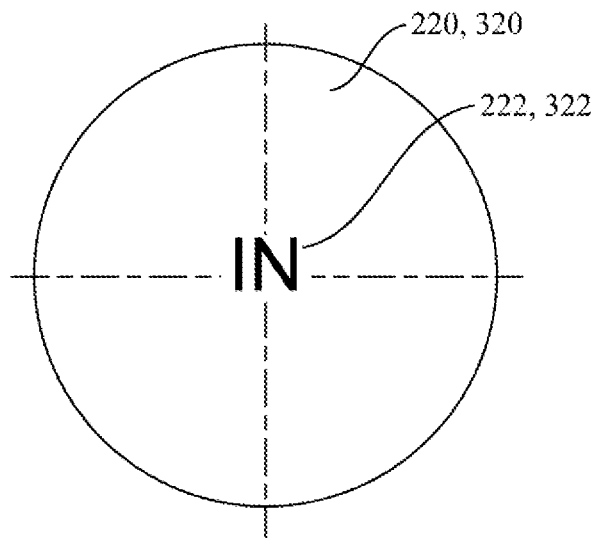
FIG. 21 is an inlet end view of the cap of the type-X vortex unit of the type-I hydrodynamic cavitation device of FIG. 2 according to an exemplary embodiment of the present disclosure.
Figure 22:
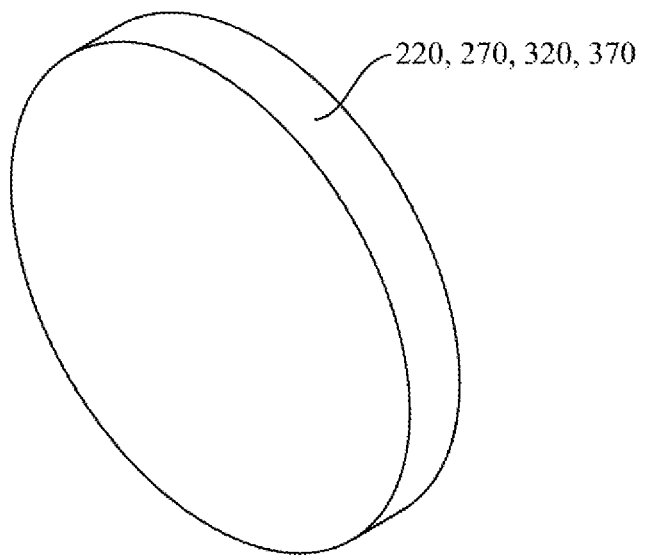
FIG. 22 is a perspective view of the cap of the type-X vortex unit of the type-I hydrodynamic cavitation device of FIG. 2 according to an exemplary embodiment of the present disclosure.

FIG. 20 is a side view of a cap 220, 270, 320, 370 of the type-X vortex unit 210, 260, 310, 360 of the type-I hydrodynamic cavitation device 200, 300 of FIG. 2 according to an exemplary embodiment of the present disclosure. FIG. 21 is an inlet end view of the cap 220, 270, 320, 370 of the type-X vortex unit 210, 260, 310, 360 of the type-I hydrodynamic cavitation device 200, 300 of FIG. 2 according to an exemplary embodiment of the present disclosure. FIG. 22 is a perspective view of the cap 220, 270, 320, 370 of the type-X vortex unit 210, 260, 310, 360 of the type-I hydrodynamic cavitation device 200, 300 of FIG. 2 according to an exemplary embodiment of the present disclosure. In some embodiments, for example, when Schedule 40 PVC conduit is used with a pipe size of 2 in, the cap 220, 270, 320, 370 may have a diameter of about 2.047 in (about 5.200 cm) and a thickness of about 0.250 in (about 0.635 cm).

In some exemplary embodiments, as shown in FIGS. 3 and 20-22, the outlet side type-X vortex unit 260, 360 may include an inner tube or stop cap 270, 370. The inner tube or stop cap 270, 370 may include indicia such as "OUT" (e.g., see, FIG. 3), which may be visible before installation of the type-I hydrodynamic cavitation device 200, 300. The indicia may be integrated into the stop cap 270, 370 in any suitable manner.

In some exemplary embodiments, as shown in FIGS. 5 and 20-22, the inlet side type-X vortex unit 210, 310 may include an inner tube or stop cap 220, 320. The inner tube or stop cap 220, 320 may include indicia such as "IN" (e.g., see, FIGS. 5 and 21), which may be visible before installation of the type-I hydrodynamic cavitation device 200, 300. The indicia may be integrated into the stop cap 220, 320 in any suitable manner.

Figure 23:
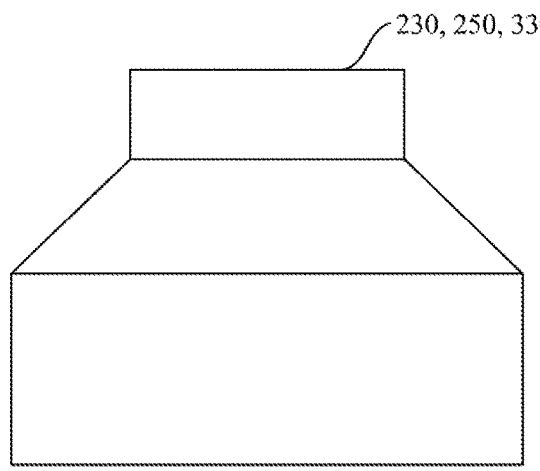
FIG. 23 is a side view of an expander/reducer of the type-I hydrodynamic cavitation device of FIG. 2 according to an exemplary embodiment of the present disclosure.
Figure 24:
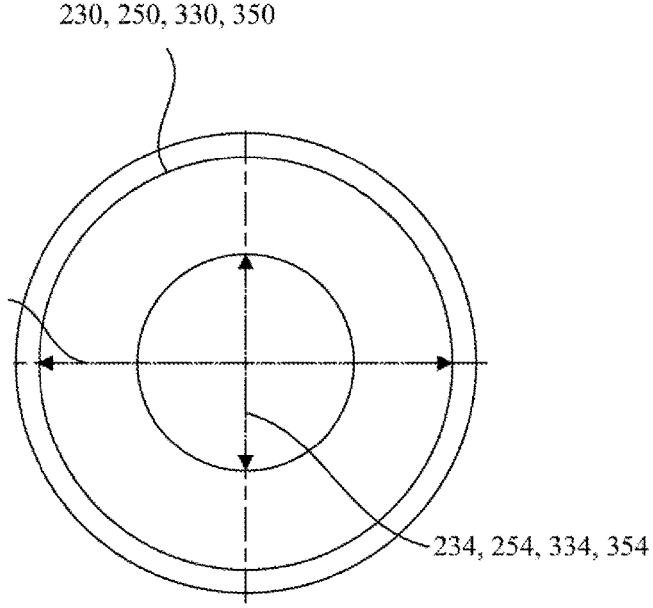
FIG. 24 is an end view of the expander/reducer of the type-I hydrodynamic cavitation device of FIG. 2 according to an exemplary embodiment of the present disclosure.
Figure 25:
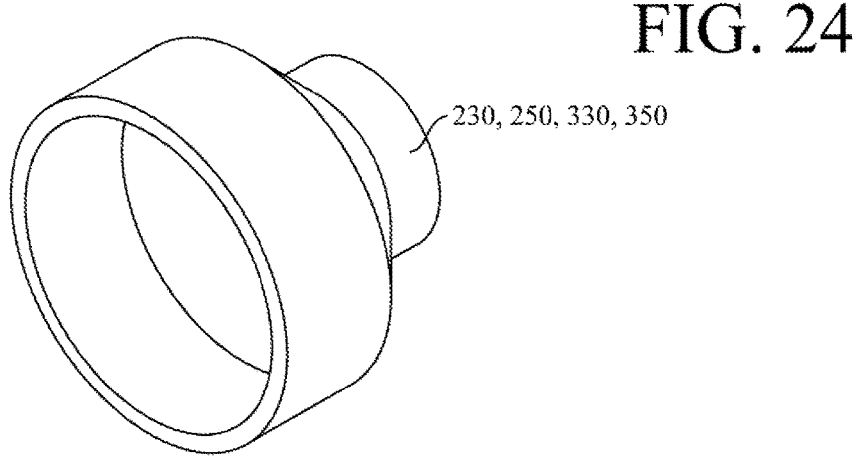
FIG. 25 is a perspective view of the expander/reducer of the type-I hydrodynamic cavitation device of FIG. 2 according to an exemplary embodiment of the present disclosure.

FIG. 23 is a side view of an expander/reducer 230, 250, 330, 350 of the type-I hydrodynamic cavitation device 200, 300 of FIG. 2 according to an exemplary embodiment of the present disclosure. FIG. 24 is an end view of the expander/reducer 230, 250, 330, 350 of the type-I hydrodynamic cavitation device 200, 300 of FIG. 2 according to an exemplary embodiment of the present disclosure. FIG. 25 is a perspective view of the expander/reducer 230, 250, 330, 350 of the type-I hydrodynamic cavitation device 200, 300 of FIG. 2 according to an exemplary embodiment of the present disclosure.

In an exemplary embodiment, when Schedule 40 PVC conduit is used with a pipe size of 2 in, the expander/reducer 230, 250, 330, 350 may be a 2 in-to-4 in expander or a 4 in-to-2 in reducer, as appropriate. With some pre-manufactured PVC expanders/reducers, an inside diameter 232, 252, 332, 352 of a relatively large section of the expander/reducer 230, 250, 330, 350 may be equipped with a pre-manufactured shoulder (not shown), which may be removed prior to manufacturing, assembly and installation of the type-I hydrodynamic cavitation device 200, 300 to accommodate, for example, an outside diameter of one or more of the cylindrical segments 235, 255, 335, 355. Additionally, an inside diameter 234, 254, 334, 354 of a relatively small section of the expander/reducer 230, 250, 330, 350 may be equipped with a pre-manufactured shoulder (not shown), which may be removed prior to manufacturing, assembly and installation of the type-I hydrodynamic cavitation device 200, 300 to accommodate, for example, an outside diameter of an inlet conduit and/or an outlet conduit, e.g., conduit 45 and conduit 47, respectively, or an outside diameter of the vortex unit 210, 260, 310, 360, as appropriate.

Figure 26:
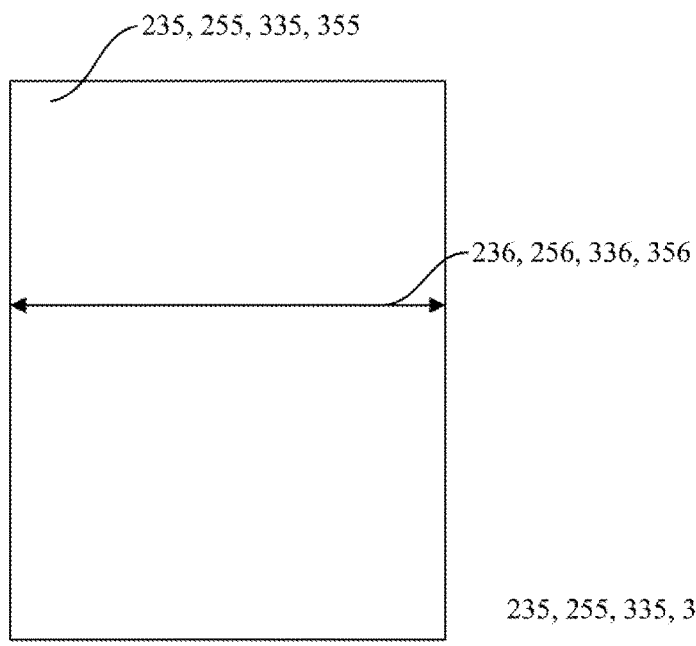
FIG. 26 is a side view of a cylindrical segment of the type-I hydrodynamic cavitation device of FIG. 2 according to an exemplary embodiment of the present disclosure.
Figure 27:
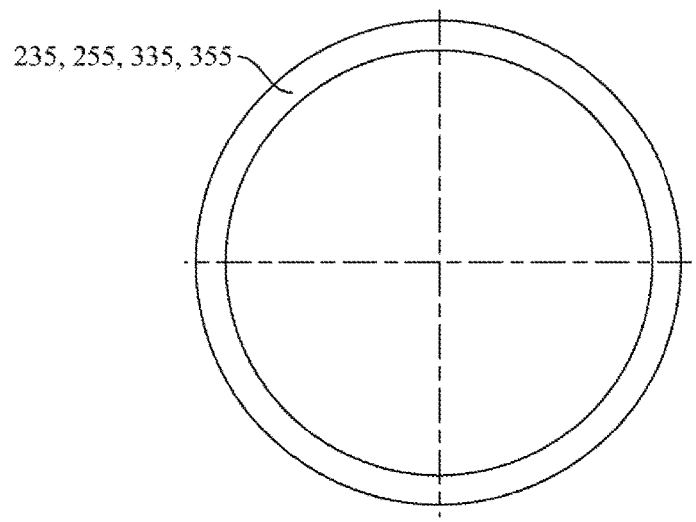
FIG. 27 is an end view of the cylindrical segment of the type-I hydrodynamic cavitation device of FIG. 2 according to an exemplary embodiment of the present disclosure.
Figure 28:
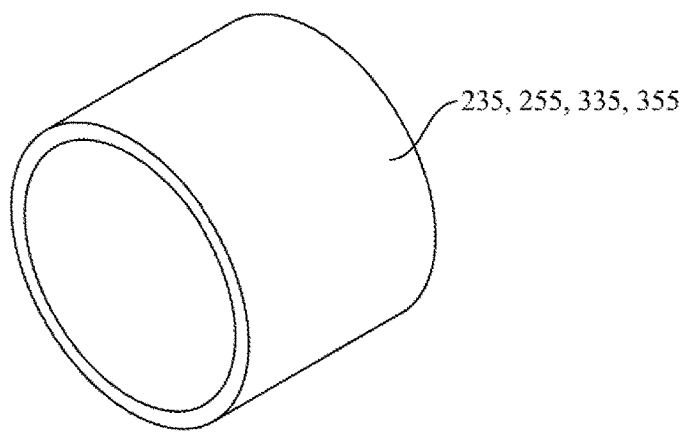
FIG. 28 is a perspective view of the cylindrical segment of the type-I hydrodynamic cavitation device of FIG. 2 according to an exemplary embodiment of the present disclosure.

FIG. 26 is a side view of a cylindrical segment 235, 255, 335, 355 of the type-I hydrodynamic cavitation device 200, 300 of FIG. 2 according to an exemplary embodiment of the present disclosure. FIG. 27 is an end view of the cylindrical segment of the type-I hydrodynamic cavitation device 200, 300 of FIG. 2 according to an exemplary embodiment of the present disclosure. FIG. 28 is a perspective view of the cylindrical segment of the type-I hydrodynamic cavitation device 200, 300 of FIG. 2 according to an exemplary embodiment of the present disclosure.

The cylindrical segment 235, 255, 335, 355 may be manufactured from any suitable material including rigid polyvinyl chloride (PVC) pipe in any suitable size including Schedule 40 and/or Schedule 80. In an exemplary embodiment, as shown in FIGS. 6, 7 and 26-28, a length 236, 256, 336, 356 of the cylindrical segment 235, 255, 335, 355 in the predominant flow direction 150 may be about 3.500 in (about 8.890 cm).

Figures 29, 30:
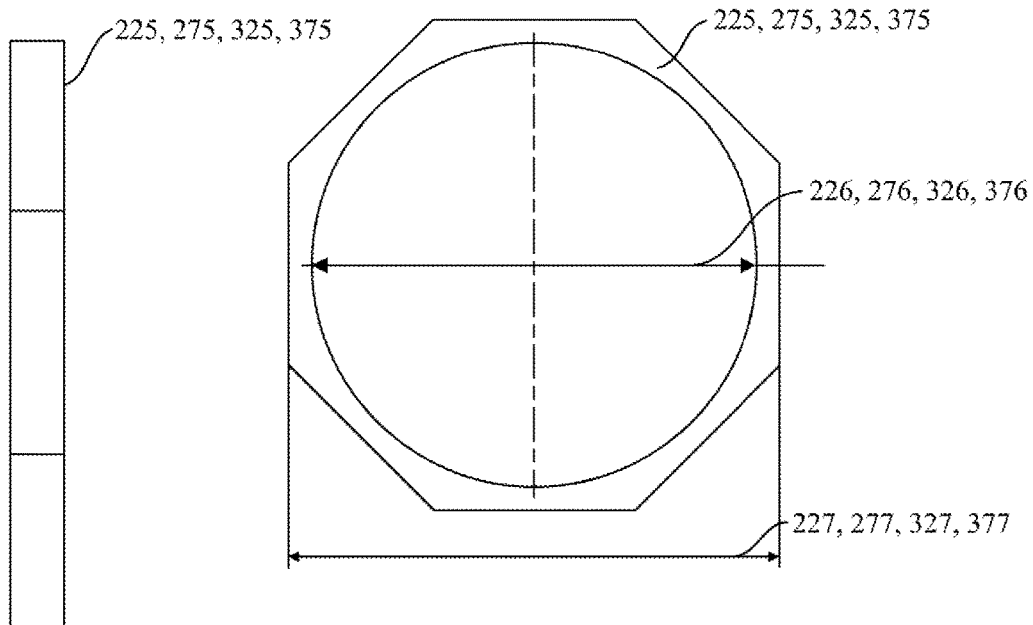
FIG. 29 is a side view of a spacer of the type-I hydrodynamic cavitation device of FIG. 2 according to an exemplary embodiment of the present disclosure.
FIG. 30 is an end view of the spacer of the type-I hydrodynamic cavitation device of FIG. 2 according to an exemplary embodiment of the present disclosure.
Figure 31:
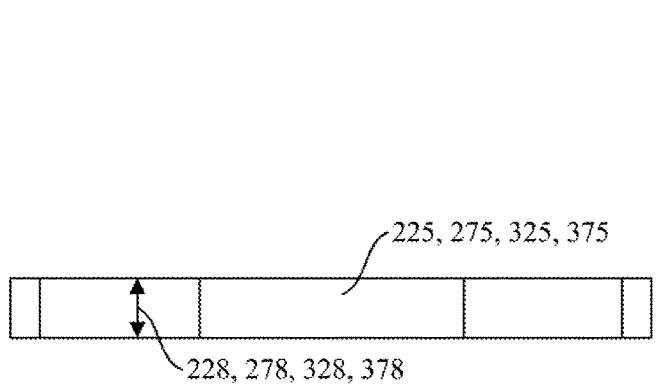
FIG. 31 is a top/bottom view of the spacer of the type-I hydrodynamic cavitation device of FIG. 2 according to an exemplary embodiment of the present disclosure.
Figure 32:
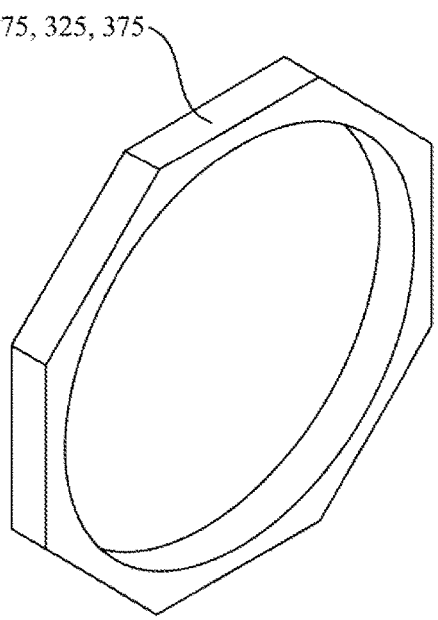
FIG. 32 is a perspective view of the spacer of the type-I hydrodynamic cavitation device of FIG. 2 according to an exemplary embodiment of the present disclosure.

FIG. 29 is a side view of a spacer 225, 275, 325, 375 of the type-I hydrodynamic cavitation device 200, 300 of FIG. 2 according to an exemplary embodiment of the present disclosure. FIG. 30 is an end view of the spacer 225, 275, 325, 375 of the type-I hydrodynamic cavitation device 200, 300 of FIG. 2 according to an exemplary embodiment of the present disclosure. FIG. 31 is a top/bottom view of the spacer 225, 275, 325, 375 of the type-I hydrodynamic cavitation device 200, 300 of FIG. 2 according to an exemplary embodiment of the present disclosure. FIG. 32 is a perspective view of the spacer 225, 275, 325, 375 of the type-I hydrodynamic cavitation device 200, 300 of FIG. 2 according to an exemplary embodiment of the present disclosure. In an exemplary embodiment, when Schedule 40 PVC conduit is used with a pipe size of 4 in, the spacer 225, 275, 325, 375 may have an inside diameter 226, 276, 326, 376 of about 5.040 in (about 12.80 cm), a width/height 227, 277, 327, 377 of about 5.550 in (about 14.10 cm), and a thickness 228, 278, 328, 378 of about 0.500 in (about 1.27 cm). The spacer 225, 275, 325, 375 may be configured for a slip fit with a PVC segment having the pipe size of 4 in. The spacer 225, 275, 325, 375 may be configured for a slip fit with the expander/reducer 230, 250, 330, 350 as shown, for example, in FIGS. 6 and 7.

Figure 33:
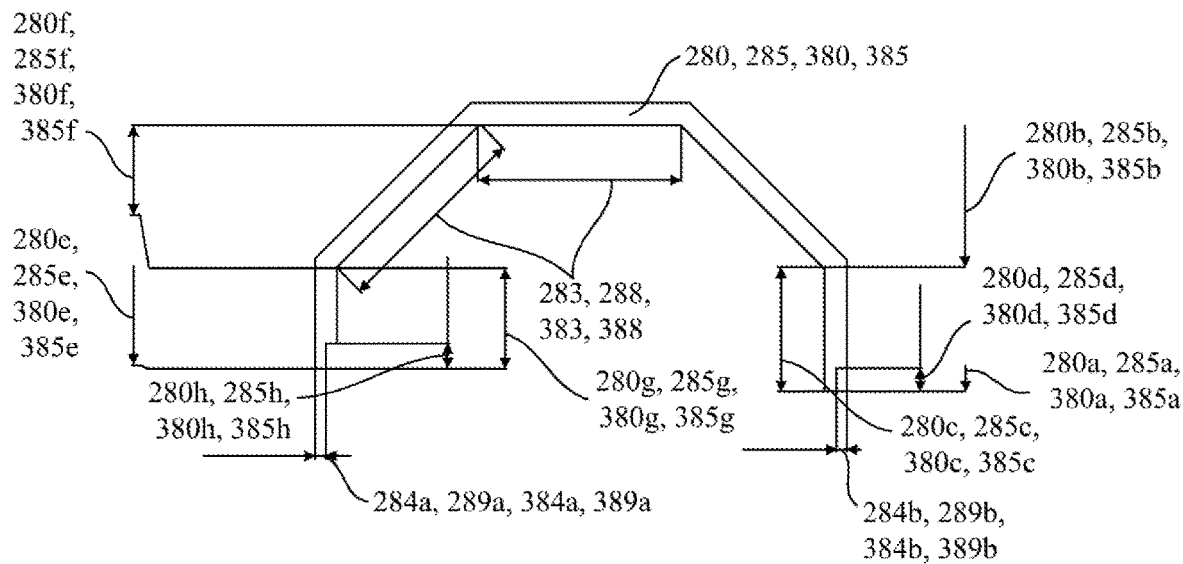
FIG. 33 is an end view of a cover segment of the type-I hydrodynamic cavitation device of FIG. 2 according to an exemplary embodiment of the present disclosure.
Figures 34, 35:
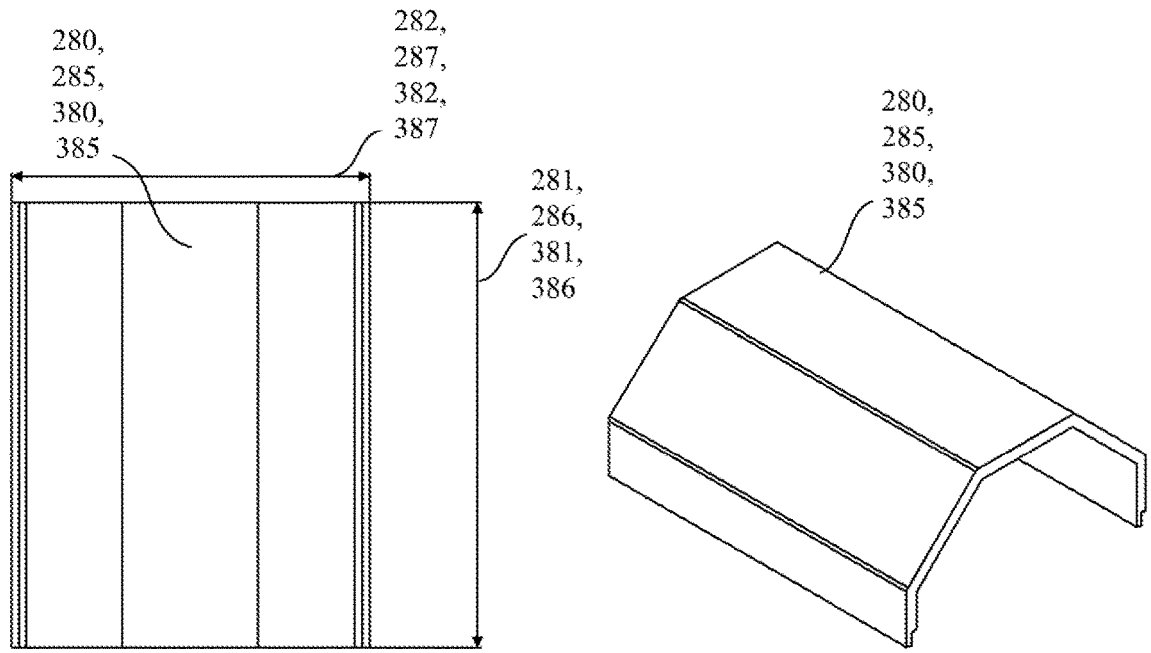
FIG. 34 is a top/bottom view of the cover segment of the type-I hydrodynamic cavitation device of FIG. 2 according to an exemplary embodiment of the present disclosure.
FIG. 35 is a perspective end view of the cover segment of the type-I hydrodynamic cavitation device of FIG. 2 according to an exemplary embodiment of the present disclosure.

FIG. 33 is an end view of a cover segment 280, 285, 380, 385 of the type-I hydrodynamic cavitation device 200, 300 of FIG. 2 according to an exemplary embodiment of the present disclosure. FIG. 34 is a top/bottom view of the cover segment 280, 285, 380, 385 of the type-I hydrodynamic cavitation device 200, 300 of FIG. 2 according to an exemplary embodiment of the present disclosure. FIG. 35 is a perspective end view of the cover segment 280, 285, 380, 385 of the type-I hydrodynamic cavitation device 200, 300 of FIG. 2 according to an exemplary embodiment of the present disclosure.

In an exemplary embodiment, as shown in FIGS. 2-7 and 33-35, the cover segment 280, 285, 380, 385 may have one or more of the following dimensions: a first upper-edge-to-lower-edge height 280*a*, 285*a*, 380*a*, 385*a* of about 3.025 in (about 7.684 cm), a first upper-edge-to-top-of-flange height 280*b*, 285*b*, 380*b*, 385*b* of about 1.626 in (about 4.130 cm), a first inner flange height 280*c*, 285*c*, 380*c*, 385*c* of about 1.399 in (about 3.553 cm), a first flange detent height 280*d*, 285*d*, 380*d*, 385*d* of about 0.250 in (about 0.635 cm), a second upper-edge-to-lower-edge height 280*e*, 285*e*, 380*e*, 385*e* of about 2.775 in (about 7.049 cm), a second upper-edge-to-top-of-flange height 280*f*, 285*f*, 380*f*, 385*f* of about 1.626 in (about 4.130 cm), a second inner flange height 280*g*, 285*g*, 380*g*, 385*g* of about 1.149 in (about 2.918 cm), a second flange detent height 280*h*, 285*h*, 380*h*, 385*h* of about 0.280 in (about 0.711 cm), a length 281, 286, 381, 386 in the predominant flow direction 150 of about 7.550 in (about 19.18 cm), a width 282, 287, 382, 387 of about 6.050 in (about 15.37 cm), an inner segment width 283, 288, 383, 388 of about 2.299 in (about 5.839 cm), a flange thickness 284*a*, 289*a*, 384*a*, 389*a* of about 0.125 in (about 0.318 cm), and a flange detent thickness 284*b*, 289*b*, 384*b*, 389*b* of about 0.125 in (about 0.318 cm). Two substantially identically sized cover segments 280, 285, 380, 385 may be configured for connection to each other using any suitable means of connection to form a protective cover.

Figure 36:
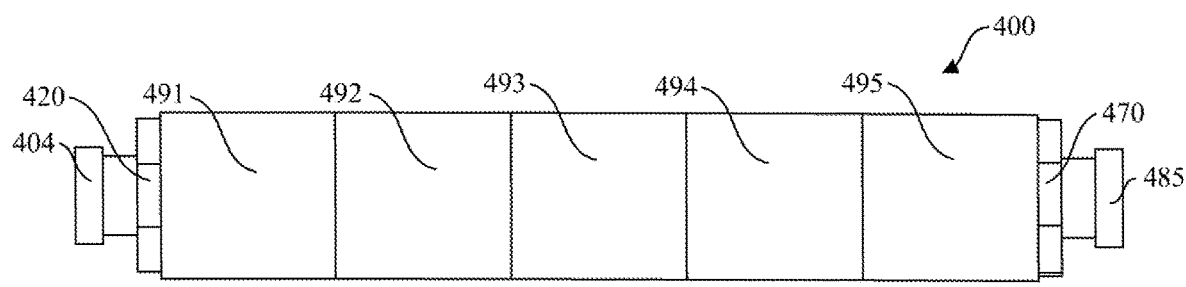
FIG. 36 is a side view of a type-II hydrodynamic cavitation device for the hydrodynamic cavitation system of FIG. 1 according to an exemplary embodiment of the present disclosure.
Figure 37:
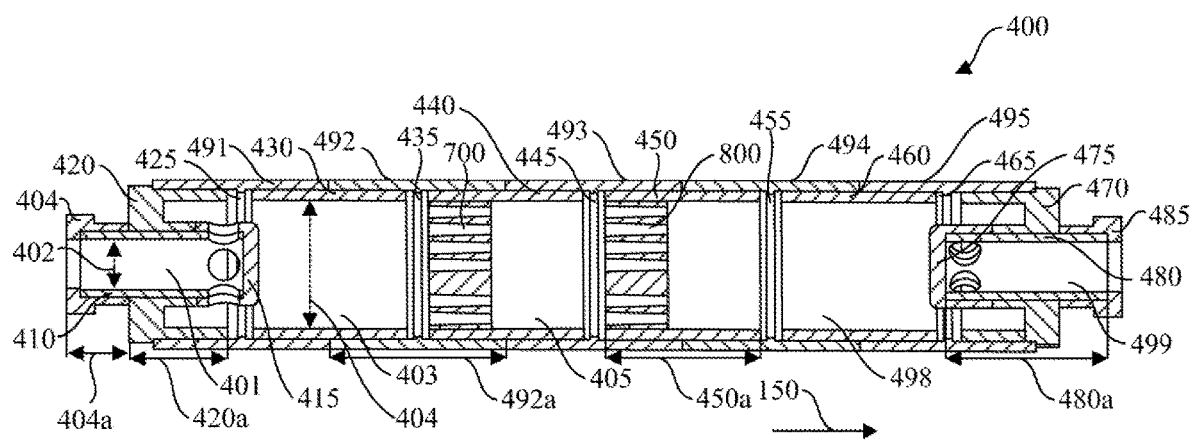
FIG. 37 is a cross-sectional side view of the type-II hydrodynamic cavitation device of FIG. 36 equipped with a pair of type-C hydrodynamic cavitation units (including type-α openings) in series according to an exemplary embodiment of the present disclosure.
Figure 45:
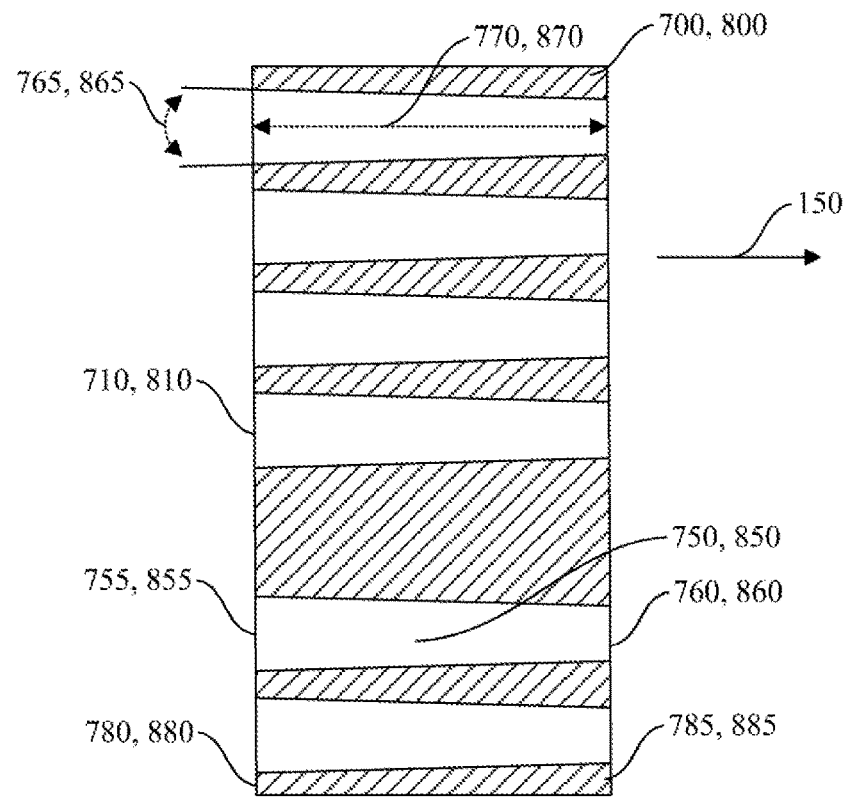
FIG. 45 is a cross-sectional side view of the type-C hydrodynamic cavitation unit of the type-II hydrodynamic cavitation device of FIG. 36 according to an exemplary embodiment of the present disclosure.

FIG. 36 is a side view of a type-II hydrodynamic cavitation device 400 for the hydrodynamic cavitation system 100 of FIG. 1 according to an exemplary embodiment of the present disclosure. As illustrated in FIGS. 36, 37 and 45, the predominant flow direction 150 is left-to-right (inlet-to-outlet).

FIG. 37 is a cross-sectional side view of the type-II hydrodynamic cavitation device 400 of FIG. 36 equipped with a type-C hydrodynamic cavitation unit 700, 800 (including type-α openings) according to an exemplary embodiment of the present disclosure. The type-C hydrodynamic cavitation unit 700, 800 (including type-α openings) will be described in greater detail hereinbelow. As illustrated in FIG. 37, the predominant flow direction 150 is left-to-right (inlet-to-outlet).

The type-II hydrodynamic cavitation device 400 may include an inlet 401 and an outlet 499. Between the inlet 401 and the outlet 499, a body of the hydrodynamic cavitation device 400 may include an inlet side type-Y vortex unit 410. The body of the hydrodynamic cavitation device 400 may include an outlet side type-Y vortex unit 480. The inlet side type-Y vortex unit 410 may be directly connected to a conduit, such as the fourth conduit 45, and the outlet side type-Y vortex unit 480 may be directly connected to a conduit, such as the fifth conduit 47. The inlet side type-Y vortex unit 410 may be connected to an inlet union 404. The outlet side type-Y vortex unit 480 may be connected to an outlet union 485. One or more of the inlet side type-Y vortex unit 410 and the outlet side type-Y vortex unit 480 may be configured to promote clockwise rotation of fluid flowing through the hydrodynamic cavitation device 400.

The body of the hydrodynamic cavitation device 400 may include an inlet side expander/reducer 420. The body of the hydrodynamic cavitation device 400 may include an outlet side expander/reducer 480.

The body of the hydrodynamic cavitation device 400 may include one or more couplers. The one or more couplers may include a first coupler 491, a second coupler 492, a third coupler 493, a fourth coupler 494 and a fifth coupler 495. Each of the one or more couplers 491, 492, 493, 494 and 495 may be connected to one or more couplings 425, 435, 445, 455 and 465, respectively, using any suitable means including adhesive or integrated into one or more components. The couplers 491, 492, 493, 494 and 495 may function as a protective cover. Each of the couplers 491, 492, 493, 494 and 495 may be a PVC coupler having a size of 2 in.

The inlet side type-Y vortex unit 410, and the outlet side type-Y vortex unit 480 may be omitted. For example, in lieu of the inlet side type-Y vortex unit 410, the inlet side expander/reducer 420 may be directly connected to a conduit, such as the fourth conduit 45. Additionally, in lieu of the outlet side type-Y vortex unit 480, the outlet side expander/reducer 480 may be directly connected to a conduit, such as the fifth conduit 47.

The inlet side type-Y vortex unit 410 may have an inside diameter 402. The inside diameter 402 may be configured to match specifications of an inlet conduit. For example, when Schedule 40 PVC conduit is used with a pipe size of 1 in, the inside diameter 402 may be about 1.029 in (about 2.61 cm). For example, when Schedule 80 PVC conduit is used with a pipe size of 1 in, the inside diameter 402 may be about 0.936 in (about 2.38 cm). Although the type-II hydrodynamic cavitation device 400 is described herein with respect to 1 in pipe size, portions of or an entirety of the type-II hydrodynamic cavitation device 400 may be scaled up or down to fit any pipe size. The inlet side type-Y vortex unit 410 may be configured to change the predominant flow direction 150 to a direction perpendicular to the predominant flow direction 150 into the chamber 403. A vortex or a region of turbulent flow may form within the chamber 403. Conversely, the outlet side type-Y vortex unit 480 may be configured to change the direction perpendicular to the predominant flow direction 150 to the predominant flow direction 150.

A radially outward surface of the inlet side type-Y vortex unit 410 may be connected to a first radially inward surface of the inlet side expander 420 using any suitable means including adhesive or integrated into a single component.

The body of the hydrodynamic cavitation device 400 may include one or more cylindrical segments. As illustrated in the exemplary embodiment of FIG. 37, the hydrodynamic cavitation device 400 may include the inlet side expander 420, a first coupling 425, a first cylindrical segment 430, a second coupling 435, a second cylindrical segment 440, a third coupling 445, a third cylindrical segment 450, a fourth coupling 455, a fourth cylindrical segment 460 and a fifth coupling 465.

A type-C hydrodynamic cavitation unit 700, 800 (including type-α openings) may be connected to a radially inward surface of the second cylindrical segment 440 and the third cylindrical segment 450 using any suitable means including adhesive or integrated into a single component.

Each of the inlet side expander 420, the first cylindrical segment 430, the second cylindrical segment 440, the third cylindrical segment 450, the fourth cylindrical segment 460 and the outlet side reducer 470 may have an inside diameter 404. For example, when Schedule 40 PVC conduit is used for the inlet side expander 420, the first cylindrical segment 430, the second cylindrical segment 440, the third cylindrical segment 450, the fourth cylindrical segment 460 and the outlet side reducer 470, the pipe size may be 2 in, and the inside diameter 404 may be about 2.047 in (about 5.199 cm). For example, when Schedule 80 PVC conduit is used for the inlet side expander 420, the first cylindrical segment 430, the second cylindrical segment 440, the third cylindrical segment 450, the fourth cylindrical segment 460 and the outlet side reducer 470, the pipe size may be 2 in, and the inside diameter 404 may be about 1.913 in (about 4.859 cm).

In some embodiments, a ratio of the inside diameter 402 of the inlet side type-Y vortex unit 410 to the inside diameter 404 of the inlet side expander 420, the first cylindrical segment 430, the second cylindrical segment 440, the third cylindrical segment 450, the fourth cylindrical segment 460 and the outlet side reducer 470 may be about 1:2 to about 1:3. The use of "about" is intentional and used herein, for example, to account for potential variations in pipe diameters due to manufacturing tolerances, variations due to differences between pipe manufacturers, the use of different pipe schedules within a given installation, and the like. For example, using Schedule 40 PVC pipe, for an inlet conduit pipe size of 1 in and when the pipe size of the inlet side expander 420, the first cylindrical segment 430, the second cylindrical segment 440, the third cylindrical segment 450, the fourth cylindrical segment 460 and the outlet side reducer 470 is 2 in, the ratio of the inside diameter 402 to the inside diameter 404 is 1.029:2.047 or 1:1.989, which may be referred to as "about 1:2". Additionally, for example, using Schedule 80 PVC pipe, for an inlet conduit pipe size of 1 in and when the pipe size of the inlet side expander 420, the first cylindrical segment 430, the second cylindrical segment 440, the third cylindrical segment 450, the fourth cylindrical segment 460 and the outlet side reducer 470 is 2 in, the ratio of the inside diameter 402 to the inside diameter 404 is 0.936:1.913 or 1:2.04, which may also be referred to as "about 1:2". Whenever a ratio is expressed in the present specification, the term "about" is generally used, and the types of variations described above are understood to be within the scope of the disclosure.

The outlet side reducer 470, the fourth cylindrical segment 460, and the outlet side type-Y vortex unit 480 may be connected in substantially the same manner as described above with respect to the inlet side expander 420, the first cylindrical segment 430, and the inlet side type-Y vortex unit 410.

Regardless of the specific means of manufacturing, the hydrodynamic cavitation device 400 may have an inlet 401 connected in series to a first chamber 403, a second chamber 405, a third chamber 498 and an outlet 499. The type-C hydrodynamic cavitation unit 700, 800 (including type-α openings) may be provided between the first chamber 403 and the third chamber 498. The second chamber 405 may be provided between a first type-C hydrodynamic cavitation unit 700 and a second type-C hydrodynamic cavitation unit 800.

Although the hydrodynamic cavitation device 400 is illustrated with the vortex unit 410, the cap 415, the expander 420, the first coupling 425, the first cylindrical segment 430, the second coupling 435, the second cylindrical segment 440, the third coupling 445, the third cylindrical segment 450, the fourth coupling 455, the fourth cylindrical segment 460, the fifth coupling 465, the reducer 480, the cap 475, the vortex unit 480, and the type-C hydrodynamic cavitation unit 700, 800 (including type-α openings) having substantially circular cross sections, any suitable cross-sectional shape may be used, e.g., circular, irregular, oval, oblong, eccentric, polygonal, triangular, rectangular, square, pentagonal, hexagonal, octagonal, complex (combinations of shapes), and the like.

Additionally, although the hydrodynamic cavitation device 400 is shown and described hereinabove in terms of separate components, e.g., the vortex unit 410, the cap 415, the expander 420, the first coupling 425, the first cylindrical segment 430, the second coupling 435, the second cylindrical segment 440, the third coupling 445, the third cylindrical segment 450, the fourth coupling 455, the fourth cylindrical segment 460, the fifth coupling 465, the reducer 480, the cap 475, the vortex unit 480, and the type-C hydrodynamic cavitation unit 700, 800 (including type-a openings), one or more of, e.g., the vortex unit 410, the cap 415, the expander 420, the first coupling 425, the first cylindrical segment 430, the second coupling 435, the second cylindrical segment 440, the third coupling 445, the third cylindrical segment 450, the fourth coupling 455, the fourth cylindrical segment 460, the fifth coupling 465, the reducer 480, the cap 475, the vortex unit 480, and the type-C hydrodynamic cavitation unit 700, 800 (including type-α openings), may be combined or integrated into one or more unitary bodies. For example, in an exemplary embodiment, the vortex unit 410, the cap 415, the expander 420, the first coupling 425, the first cylindrical segment 430, the second coupling 435, the second cylindrical segment 440, the third coupling 445, the third cylindrical segment 450, the fourth coupling 455, the fourth cylindrical segment 460, the fifth coupling 465, the reducer 480, the cap 475, and the vortex unit 480 may be formed by injection molding and integrated into a unitary body. In such exemplary embodiment, a radially inward surface of the expander 420 may be directly connected to a first pipe (e.g., conduit 45) connected to a source of water containing impurities, and a radially inward surface of the reducer 480 may be directly connected to a second pipe (e.g., conduit 47) connected to a destination (e.g., a swimming pool, spa, pond, water feature (e.g., fountain), water park, or the like) for the water passing through the hydrodynamic cavitation device 400.

FIG. 37 is a cross-sectional side view of the type-II hydrodynamic cavitation device 400 of FIG. 36 equipped with a pair of type-C hydrodynamic cavitation units 700, 800 (including type-a openings) in series according to an exemplary embodiment of the present disclosure. In an exemplary embodiment, a length 404a in the predominant flow direction 150 from an inlet end of the inlet union 404 to an inlet end of the expander 420 may be about 1.000 in (about 2.540 cm). A length in the predominant flow direction 150 from an outlet end of the outlet union 485 to an outlet end of the reducer 470 may be about 1.000 in (about 2.540 cm). A length 420a in the predominant flow direction 150 from the inlet end of the expander 420 to an opposite end of the expander 420 (abutting the coupling 425) may be about 1.575 in (about 4.001 cm). A length in the predominant flow direction 150 from the outlet end of the reducer 470 to an opposite end of the reducer 470 (abutting the coupling 465) may be about 1.575 in (about 4.001 cm). A length 492a in the predominant flow direction 150 of the coupler 492 may be about 2.850 in (about 7.239 cm). A length in the predominant flow direction 150 of each of the couplers 491, 493, 494 and 495 may be about 2.850 in (about 7.239 cm). A length 450*a* in the predominant flow direction 150 of the segment 450 may be about 2.500 in (about 6.350 cm). A length in the predominant flow direction 150 of each the segments 430, 440 and 460 may be about 2.500 in (about 6.350 cm). A length 480*a* in the predominant flow direction 150 of the vortex unit 480 may be about 2.610 in (about 6.629 cm). A length in the predominant flow direction 150 of the vortex unit 410 may be about 2.610 in (about 6.629 cm).

Figure 38:
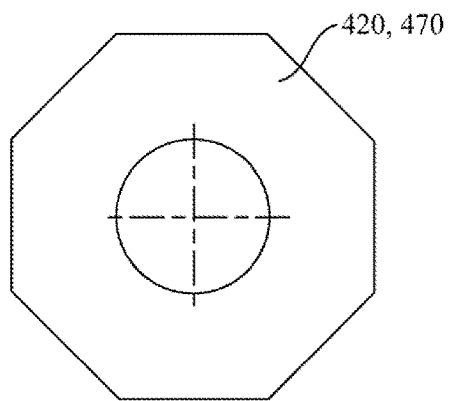
FIG. 38 is an inlet/outlet end view of a reducer/expander of the type-II hydrodynamic cavitation device of FIG. 36 according to an exemplary embodiment of the present disclosure.
Figure 39:
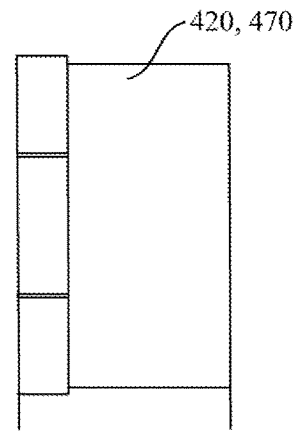
FIG. 39 is a side view of the reducer/expander of the type-II hydrodynamic cavitation device of FIG. 36 according to an exemplary embodiment of the present disclosure.
Figure 40:
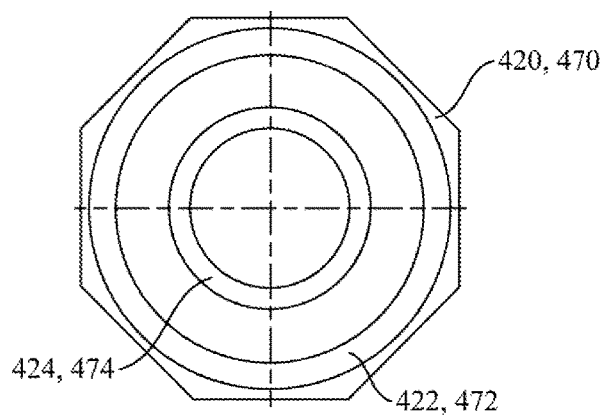
FIG. 40 is an outlet/inlet end view of the reducer/expander of the type-II hydrodynamic cavitation device of FIG. 36 according to an exemplary embodiment of the present disclosure.
Figure 41:
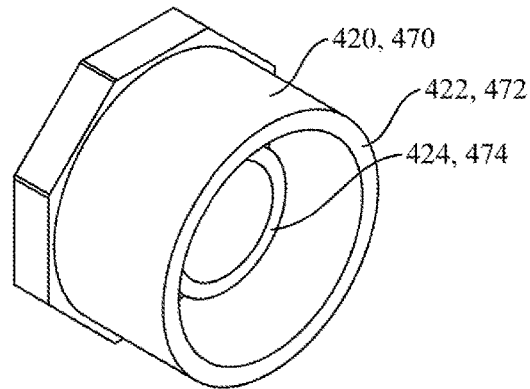
FIG. 41 is a perspective end view of the reducer/expander of the type-II hydrodynamic cavitation device of FIG. 36 according to an exemplary embodiment of the present disclosure.

FIG. 38 is an inlet/outlet end view of a reducer/expander 420, 470 of the type-II hydrodynamic cavitation device 400 of FIG. 36 according to an exemplary embodiment of the present disclosure. FIG. 39 is a side view of the reducer/expander 420, 470 of the type-II hydrodynamic cavitation device 400 of FIG. 36 according to an exemplary embodiment of the present disclosure. FIG. 40 is an outlet/inlet end view of the reducer/expander 420, 470 of the type-II hydrodynamic cavitation device 400 of FIG. 36 according to an exemplary embodiment of the present disclosure. FIG. 41 is a perspective end view of the reducer/expander 420, 470 of the type-II hydrodynamic cavitation device 400 of FIG. 36 according to an exemplary embodiment of the present disclosure.

In an exemplary embodiment, as shown in FIGS. 38-41, the reducer/expander 420, 470 may include an outer large diameter portion 422, 472 and an inner small diameter portion 424, 474. A length 421, 471 of the reducer/expander 420, 470 in the predominant flow direction 150 may be about 1.575 in (about 4.001 cm). With some pre-manufactured PVC expanders/reducers, the expander/reducer 420, 470 may be equipped with a pre-manufactured step or shoulder (not shown), which may be removed prior to manufacturing, assembly and installation of the type-II hydrodynamic cavitation device 400 to accommodate, for example, an outside diameter of an inlet conduit, an outlet conduit, and/or the vortex 410, 480. Each of the reducer/expander 420, 470 may be a PVC bushing having a size of 1 in×2 in.

Figure 42:
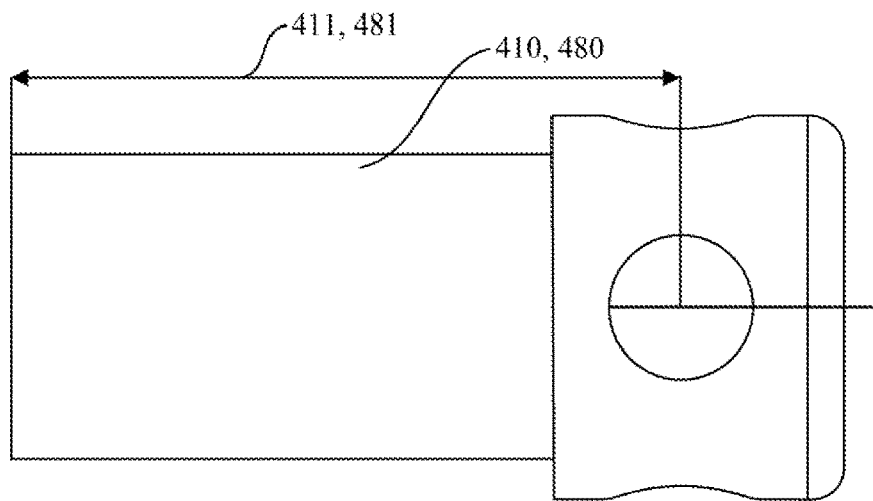
FIG. 42 is a side view of a type-Y vortex unit of the type-II hydrodynamic cavitation device of FIG. 36 according to an exemplary embodiment of the present disclosure.
Figure 43:
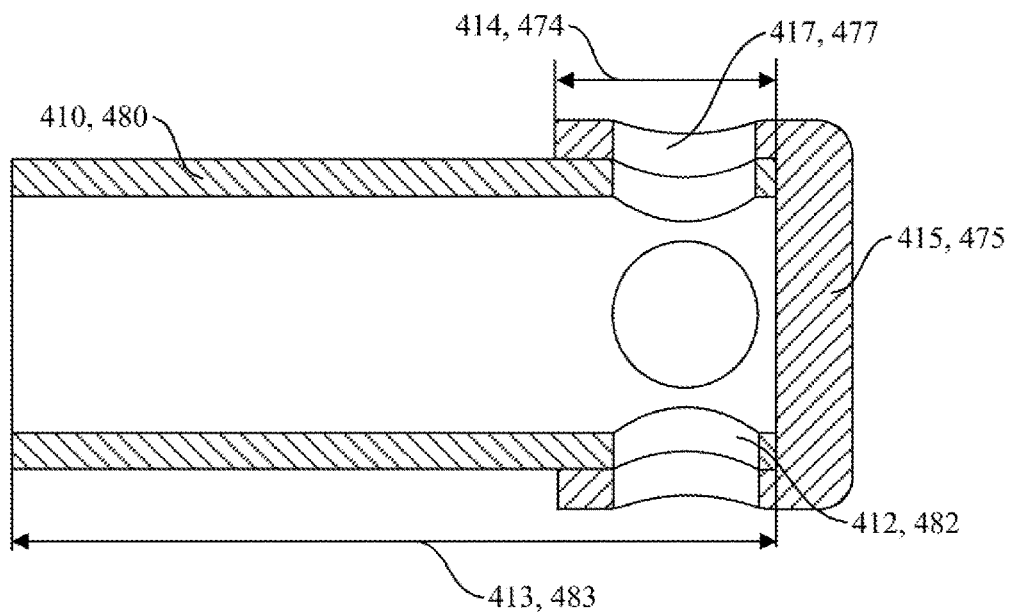
FIG. 43 is a cross-sectional side view of the type-Y vortex unit (including a cap) of the type-II hydrodynamic cavitation device of FIG. 36 according to an exemplary embodiment of the present disclosure.
Figure 44:
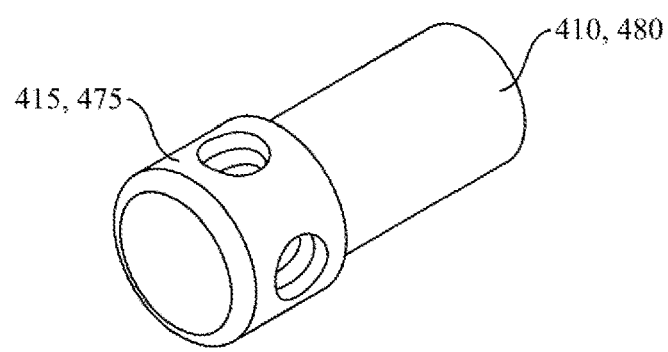
FIG. 44 is a perspective end view of the type-Y vortex unit (including the cap) of the type-II hydrodynamic cavitation device of FIG. 36 according to an exemplary embodiment of the present disclosure.

FIG. 42 is a side view of a type-Y vortex unit 410, 480 of the type-II hydrodynamic cavitation device 400 of FIG. 36 according to an exemplary embodiment of the present disclosure. FIG. 43 is a cross-sectional side view of the type-Y vortex unit 410, 480 (including a cap 415, 475) of the type-II hydrodynamic cavitation device 400 of FIG. 36 according to an exemplary embodiment of the present disclosure. FIG. 44 is a perspective end view of the type-Y vortex unit 410, 480 (including the cap 415, 475) of the type-II hydrodynamic cavitation device 400 of FIG. 36 according to an exemplary embodiment of the present disclosure.

In an exemplary embodiment, as shown in FIGS. 42-44, the type-Y vortex unit 410, 480 may include 4 openings 412, 482 spaced 90° apart. Each opening 412, 482 may have a diameter of about 0.500 in (about 1.27 cm). The cap 415, 475 may include 4 openings 417, 477 spaced 90° apart. Each opening 417, 477 may have a diameter of about 0.500 in (about 1.27 cm). A length 411, 481 from a center of the openings 412, 417, 477, 482 to an end of the type-Y vortex unit 410, 480 may be about 2.300 in (about 5.842 cm). A length 413, 483 from one end of the type-Y vortex unit 410, 480 to another end of the type-Y vortex unit 410, 480 may be about 2.610 in (about 6.629 cm). A length 414, 474 from the one end of the type-Y vortex unit 410, 480 to an opposite facing end of the cap 415, 475 may be about 0.750 in (about 1.91 cm).

Figure 46:
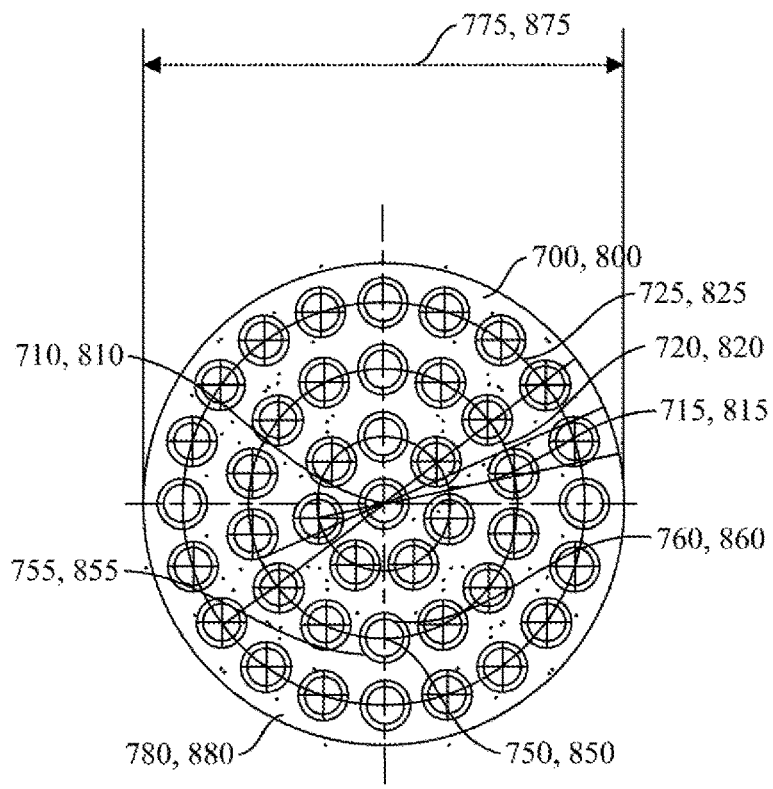
FIG. 46 is an inlet end view of the type-C hydrodynamic cavitation unit of the type-II hydrodynamic cavitation device of FIG. 36 according to an exemplary embodiment of the present disclosure.

FIG. 45 is a cross-sectional side view of the type-C hydrodynamic cavitation unit 700, 800 of the type-II hydrodynamic cavitation device 400 of FIG. 36 according to an exemplary embodiment of the present disclosure. FIG. 46 is an inlet end view of the type-C hydrodynamic cavitation unit 700, 800 of the type-II hydrodynamic cavitation device 400 of FIG. 36 according to an exemplary embodiment of the present disclosure. One or more features of one or both of the type-C hydrodynamic cavitation units 700, 800 of FIGS. 45 and 46 may be similar to one or more features of one or both of the type-A hydrodynamic cavitation unit 500 and the type-B hydrodynamic cavitation unit 600 of FIGS. 6-15, respectively. Although both of the type-C hydrodynamic cavitation units 700, 800 are illustrated in FIGS. 45 and 46 with the type-a (frustoconical) openings, one or more openings of one or both of the type-C hydrodynamic cavitation units 700, 800 may be the type-β opening. Like features and structures and are labeled in FIGS. 45 and 46 with like reference numbers to those of FIGS. 6-15 except that a format of 7XX or 8XX is used instead of the format of 5XX or 6XX, where XX are the second and third digits of the reference number. In an exemplary embodiment, as shown in FIG. 46, a diameter 775, 875 of the type-C hydrodynamic cavitation unit 700, 800 may be about 2.045 in (about 5.194 cm). An outside diameter surface of the type-C hydrodynamic cavitation unit 700, 800 may be slip and/or glue fit with an inside diameter of the segments 440, 450, respectively.

The plurality of type-α openings 750, 850 may be arranged in any suitable configuration or pattern. For example, as shown in FIG. 46, the plurality of type-α openings 750, 850 may be arranged in a plurality of generally concentric rings 715, 720, 725, 815, 820, 825 about the axis 710, 810 of the type-C hydrodynamic cavitation unit 700, 800. The type-C hydrodynamic cavitation unit 700, 800 may include a single type-α opening 750, 850 centered on the axis 710, 810. The ring 715, 815 may include 7 type-α openings 750, 850, each having a center located a spaced distance of about 0.570 in (about 1.45 cm) from the axis 710, 810, and each being spaced about 51.4° apart. The ring 720, 820 may include 14 type-α openings 750, 850, each having a center located a spaced distance of about 1.140 in (about 2.90 cm) from the axis 710, 810, and each being spaced about 25.7° apart. The ring 725, 825 may include 20 type-α openings 750, 850, each having a center located a spaced distance of about 1.710 in (about 4.343 cm) from the axis 710, 810, and each being spaced about 18° apart.

In an exemplary embodiment, as shown in FIG. 46, the type-C hydrodynamic cavitation unit 700, 800 may have 42 type-α openings 750, 850. A total cross-sectional area of the 42 type-a openings 750, 850 on the inlet surface 780, 880 may be about 1.48 in² (about 9.56 cm²). A total cross-sectional area of the 142 type-α openings 750, 850 on the outlet surface 785, 885 may be about 0.844 in² (about 5.45 cm²). The total cross-sectional area of the 42 type-α openings 750, 850 may linearly vary from the inlet surface 780, 880 to the outlet surface 785, 885.

In an exemplary embodiment, a pair of the type-II hydrodynamic cavitation devices 400 may be installed in series at in a water supply line, e.g., at or near an end of the water supply line. In such configuration, water flowing through the system undergoes four cavitation cycles, i.e., first and second cavitation cycles in chambers 405 and 409 of a first of the pair of the type-II hydrodynamic cavitation devices 400, and third and fourth cavitation cycles in chambers 405 and 409 of a second of the pair of the type-II hydrodynamic cavitation devices 400.

One or more of any of the hydrodynamic cavitation devices may be used in series or in parallel, in a loop (such as shown in FIG. 1) or in a single pass at or near the end of the water supply line, e.g., at a point of dispensation, such as a water faucet, a water cooler or a fresh water component of a soda fountain.

The foregoing description has been directed to exemplary embodiments of the present disclosure. It will be apparent, however, that other variations and modifications may be made to the described exemplary embodiments, with the attainment of some or all of their advantages. Accordingly, this description is to be taken only by way of example and not to otherwise limit the scope of the exemplary embodiments herein. Therefore, it is the object of the appended claims to cover all such variations and modifications as come within the true spirit and scope of the exemplary embodiments herein.

What is claimed is:

1. A hydrodynamic cavitation unit for a hydrodynamic cavitation device provided in fluid communication with an inlet conduit and an outlet conduit, the hydrodynamic cavitation unit comprising:
   a body; and
   at least one lumen through the body, the at least one lumen configured for fluid communication from the inlet conduit, through the body, and to the outlet conduit,
   wherein a ratio of a total cross-sectional area of the at least one lumen to a cross-sectional area of the inlet conduit is about 1:1,
   wherein a ratio of a cross-sectional area of the hydrodynamic cavitation unit to the cross-sectional area of the inlet conduit is about 2:1,
   wherein the at least one lumen has a frustoconical shape, and
   wherein the at least one lumen having the frustoconical shape is disposed at a pitch angle greater than about 2° and less than about 5°.

2. The hydrodynamic cavitation unit of claim 1, wherein the pitch angle is about 3°.

3. The hydrodynamic cavitation unit of claim 1, wherein the hydrodynamic cavitation unit configured with the 1:1 ratio and the 2:1 ratio generates hydrodynamic cavitation in response to the fluid communication at a rate of greater than about 10 gallons per minute and less than about 110 gallons per minute.

4. The hydrodynamic cavitation unit of claim 1,
   wherein the hydrodynamic cavitation unit excludes a catalyst, and
   wherein the hydrodynamic cavitation device excludes the catalyst.

5. The hydrodynamic cavitation unit of claim 1,
   wherein the at least one lumen includes an inlet opening,
   wherein the at least one lumen includes an outlet opening,
   wherein the inlet opening has an inlet area,
   wherein the outlet opening has an outlet area, and
   wherein a ratio of the outlet area to the inlet area is about 0.75.

6. The hydrodynamic cavitation unit of claim 5, wherein the 1:1 ratio of the total cross-sectional area of the at least one lumen to the cross-sectional area of the inlet conduit occurs at an intermediate point of the at least one lumen between the inlet opening and the outlet opening.

7. The hydrodynamic cavitation unit of claim 6,
   wherein the intermediate point is located a first spaced distance apart from the inlet opening, and a second spaced distance apart from the outlet opening,
   wherein a ratio of the first spaced distance to the second spaced distance is about 4:1.

8. The hydrodynamic cavitation unit of claim 1, wherein the area within the at least one lumen linearly decreases from an inlet side of the hydrodynamic cavitation unit to an outlet side of the hydrodynamic cavitation unit.

9. A hydrodynamic cavitation unit for a hydrodynamic cavitation device provided in fluid communication with an inlet conduit and an outlet conduit, the hydrodynamic cavitation unit comprising:
   a body; and
   at least one lumen through the body, the at least one lumen configured for fluid communication from the inlet conduit, through the body, and to the outlet conduit,
   wherein a ratio of a total cross-sectional area of the at least one lumen to a cross-sectional area of the inlet conduit is about 1:1,
   wherein a ratio of a cross-sectional area of the hydrodynamic cavitation unit to the cross-sectional area of the inlet conduit is about 2:1,
   wherein the at least one lumen has a frustoconical shape,
   wherein the frustoconical shape has an inlet maximum cross-sectional dimension, an outlet maximum cross-sectional dimension, and a length in a direction perpendicular to the inlet maximum cross-sectional dimension and the outlet maximum cross-sectional dimension, and
   wherein a ratio of the inlet maximum cross-sectional dimension to the outlet cross-sectional dimension to the length is about 212:160:1000, respectively.

10. A hydrodynamic cavitation unit for a hydrodynamic cavitation device provided in fluid communication with an inlet conduit and an outlet conduit, the hydrodynamic cavitation unit comprising:
    a body; and
    at least one lumen through the body, the at least one lumen configured for fluid communication from the inlet conduit, through the body, and to the outlet conduit,
    wherein a ratio of a total cross-sectional area of the at least one lumen to a cross-sectional area of the inlet conduit is about 1:1,
    wherein a ratio of a cross-sectional area of the hydrodynamic cavitation unit to the cross-sectional area of the inlet conduit is about 2:1,
    wherein the at least one lumen has a Venturi shape,
    wherein the Venturi shape has an inlet opening, an inlet region, an outlet region, a throat region between the inlet region and the outlet region, and an outlet opening,
    wherein the inlet region is disposed at a first pitch angle greater than about 8° and less than about 12°, and
    wherein the outlet region is disposed at a second pitch angle greater than about 2° and less than about 5°.

11. The hydrodynamic cavitation unit of claim 10,
    wherein the first pitch angle is about 10°, and
    wherein the second pitch angle is about 3°.

12. A hydrodynamic cavitation unit for a hydrodynamic cavitation device provided in fluid communication with an inlet conduit and an outlet conduit, the hydrodynamic cavitation unit comprising:
    a body; and
    at least one lumen through the body, the at least one lumen configured for fluid communication from the inlet conduit, through the body, and to the outlet conduit,
    wherein a ratio of a total cross-sectional area of the at least one lumen to a cross-sectional area of the inlet conduit is about 1:1, wherein a ratio of a cross-sectional area of the hydrodynamic cavitation unit to the cross-sectional area of the inlet conduit is about 2:1,
wherein the at least one lumen has a Venturi shape,
wherein the Venturi shape has an inlet opening, an inlet region, an outlet region, a throat region between the inlet region and the outlet region, and an outlet opening,
wherein the 1:1 ratio of the total cross-sectional area of the at least one lumen to the cross-sectional area of the inlet conduit occurs at a first intermediate point of the at least one lumen in the inlet region,
wherein the 1:1 ratio of the total cross-sectional area of the at least one lumen to the cross-sectional area of the inlet conduit occurs at a second intermediate point of the at least one lumen in the outlet region,
wherein the first intermediate point is located a first spaced distance apart from the inlet opening, and a second spaced distance apart from the throat region,
wherein a first ratio of the first spaced distance to the second spaced distance is between about 3:1 to about 4:1,
wherein the second intermediate point is located a third spaced distance apart from the outlet opening, and a fourth spaced distance apart from the throat region, and
wherein a second ratio of the third spaced distance to the fourth spaced distance is about 1:3.

13. A hydrodynamic cavitation unit for a hydrodynamic cavitation device provided in fluid communication with an inlet conduit and an outlet conduit, the hydrodynamic cavitation unit comprising:
a body; and
at least one lumen through the body, the at least one lumen configured for fluid communication from the inlet conduit, through the body, and to the outlet conduit,
wherein a ratio of a total cross-sectional area of the at least one lumen to a cross-sectional area of the inlet conduit is about 1:1,
wherein a ratio of a cross-sectional area of the hydrodynamic cavitation unit to the cross-sectional area of the inlet conduit is about 2:1,
wherein the at least one lumen has a Venturi shape,
wherein the Venturi shape has an inlet region, an outlet region, and a throat region between the inlet region and the outlet region,
wherein a ratio of a first length of the inlet region to a second length of the throat region to a third length of the outlet region is about 300:300:350, respectively, and
wherein a ratio of a first cross-sectional area of the inlet region to a second cross-sectional area of the throat region to a third cross-sectional area of the outlet region is about 212:160:175, respectively.

14. A hydrodynamic cavitation unit for a hydrodynamic cavitation device provided in fluid communication with an inlet conduit and an outlet conduit, the hydrodynamic cavitation unit comprising:
a body; and
at least one lumen through the body, the at least one lumen configured for fluid communication from the inlet conduit, through the body, and to the outlet conduit,
wherein the at least one lumen has:
a frustoconical shape,
wherein the at least one lumen having the frustoconical shape is disposed at a pitch angle greater than about 2° and less than about 5°, or
a Venturi shape,
wherein the Venturi shape has an inlet opening, an inlet region, an outlet region, a throat region between the inlet region and the outlet region, and an outlet opening,
wherein the inlet region is disposed at a first pitch angle greater than about 8° and less than about 12°, and
wherein the outlet region is disposed at a second pitch angle greater than about 2° and less than about 5°.

* * * * *

UNITED STATES PATENT AND TRADEMARK OFFICE
CERTIFICATE OF CORRECTION

PATENT NO. : 10,934,180 B1  
APPLICATION NO. : 16/836346  
DATED : March 2, 2021  
INVENTOR(S) : Keith A. Morrill Page 1 of 1

It is certified that error appears in the above-identified patent and that said Letters Patent is hereby corrected as shown below:

On the Title Page  
Item (57) In the Abstract, at Line 12, delete "2:1" and add --4:1--.

In the Specification  
At Column 1, Line 54, delete "2:1" and add --4:1--.  
At Column 2, Line 48, delete "2:1" and add --4:1--.  
At Column 3, Line 1, delete "2:1" and add --4:1--.  
At Column 3, Line 2, delete "2:1" and add --4:1--.

In the Claims  
At Column 27, Line 33 (Claim 1, Line 14), delete "2:1" and add --4:1--.  
At Column 27, Line 43 (Claim 3, Line 2), delete "2:1" and add --4:1--.  
At Column 28, Line 20 (Claim 9, Line 14), delete "2:1" and add --4:1--.  
At Column 28, Line 44 (Claim 10, Line 14), delete "2:1" and add --4:1--.  
At Column 29, Line 3 (Claim 12, Line 14), delete "2:1" and add --4:1--.  
At Column 30, Line 3 (Claim 13, Line 14), delete "2:1" and add --4:1--.

Signed and Sealed this  
Twenty-third Day of November, 2021

Drew Hirshfeld  
*Performing the Functions and Duties of the*  
*Under Secretary of Commerce for Intellectual Property and*  
*Director of the United States Patent and Trademark Office*